(12) United States Patent
Sunter et al.

(10) Patent No.: US 7,158,899 B2
(45) Date of Patent: Jan. 2, 2007

(54) CIRCUIT AND METHOD FOR MEASURING JITTER OF HIGH SPEED SIGNALS

(75) Inventors: Stephen K. Sunter, Nepean (CA); Aubin P. J. Roy, Gatineau (CA)

(73) Assignee: LogicVision, Inc., San Jose, CA (US)

( * ) Notice: Subject to any disclaimer, the term of this patent is extended or adjusted under 35 U.S.C. 154(b) by 0 days.

(21) Appl. No.: 10/947,189

(22) Filed: Sep. 23, 2004

(65) Prior Publication Data

US 2005/0069031 A1    Mar. 31, 2005

Related U.S. Application Data

(60) Provisional application No. 60/558,102, filed on Apr. 2, 2004, provisional application No. 60/545,953, filed on Feb. 20, 2004, provisional application No. 60/523,323, filed on Nov. 20, 2003, provisional application No. 60/505,436, filed on Sep. 24, 2003.

(51) Int. Cl.
*G01R 29/00* (2006.01)

(52) U.S. Cl. ............. 702/69; 702/75; 702/79; 702/179; 375/225; 375/226

(58) Field of Classification Search ........... 702/69, 702/66, 67, 73–75, 70, 71, 79, 124–126, 702/189, 64, 65, 117, 179, 180; 375/224–226, 375/228, 371, 259
See application file for complete search history.

(56) References Cited

U.S. PATENT DOCUMENTS

| 5,404,362 | A * | 4/1995 | Meitner ............. 714/798 |
| 5,481,563 | A * | 1/1996 | Hamre ............. 375/226 |
| 6,185,510 | B1 * | 2/2001 | Inoue ............. 702/69 |
| 6,295,315 | B1 | 9/2001 | Frisch et al. ............. 375/226 |
| 6,320,911 | B1 * | 11/2001 | Cucchi et al. ............. 375/259 |
| 6,396,889 | B1 | 5/2002 | Sunter et al. ............. 375/376 |
| 6,768,430 | B1 * | 7/2004 | Weinstein ............. 341/61 |
| 6,970,528 | B1 * | 11/2005 | Pearson ............. 375/371 |
| 6,985,550 | B1 * | 1/2006 | Blake ............. 375/356 |
| 2002/0118738 | A1 | 8/2002 | Whitlock ............. 375/226 |
| 2002/0136337 | A1 | 9/2002 | Chatterjee et al. ............. 375/355 |
| 2002/0176491 | A1 | 11/2002 | Kleck et al. ............. 375/226 |
| 2004/0260492 | A1 | 12/2004 | Halle et al. ............. 702/69 |

FOREIGN PATENT DOCUMENTS

WO    WO 99/57842    * 11/1999

* cited by examiner

*Primary Examiner*—Hal Wachsman
(74) *Attorney, Agent, or Firm*—Eugene E. Prouix

(57) ABSTRACT

A method and circuit for measuring a statistical value of jitter for a data signal having a data rate $f_D$, comprises digitally sampling the data signal at a sampling rate, $f_S$, to produce sampled logic values, where $f_D/f_S$ is a predetermined non-integer ratio; and analyzing the sampled values to deduce a statistical value of the jitter.

47 Claims, 22 Drawing Sheets

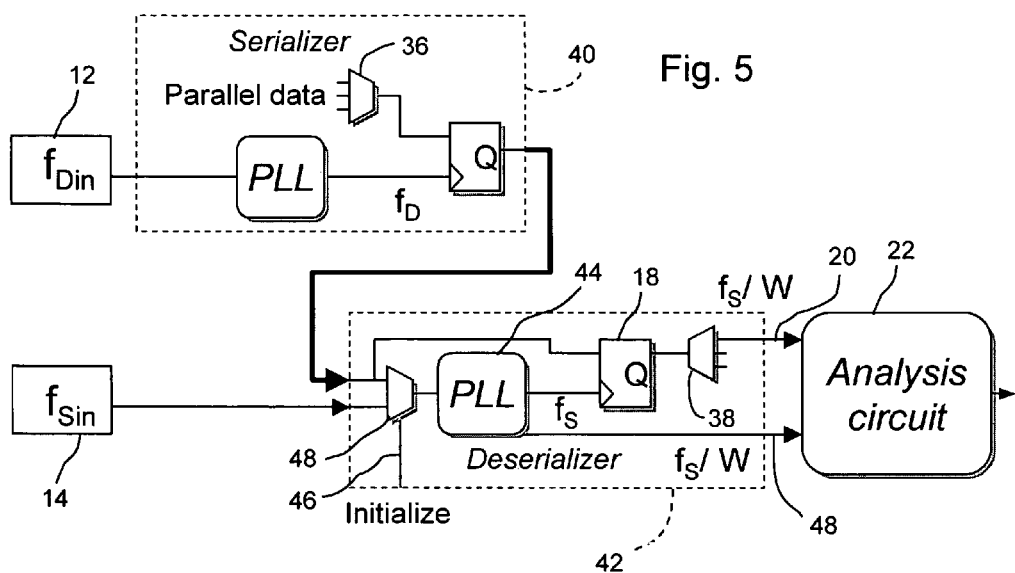

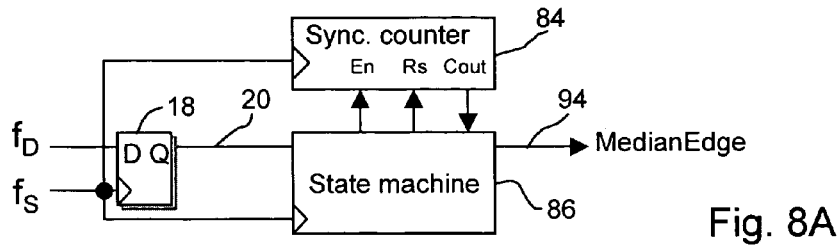
Fig. 8A
Fig. 8B
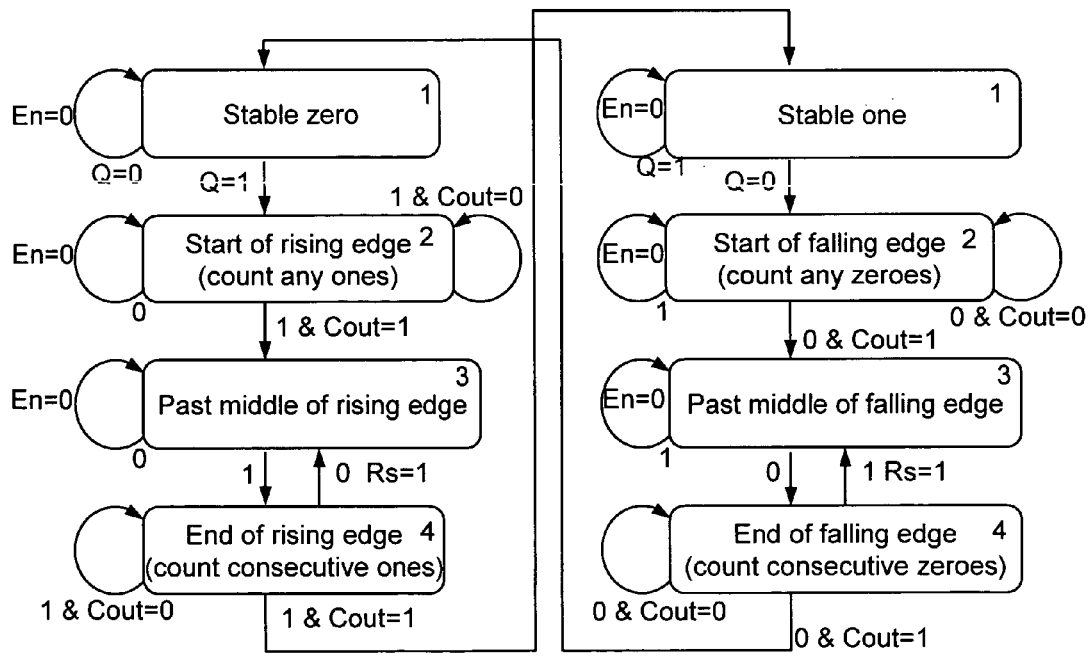
MedianEdge=1 during States 3, 4, 5, and 6; otherwise MedianEdge=0.
En=1 (Enable) and Rs=0 (Reset) except where indicated otherwise.
Counter output returns to zero after reaching its maximum count.

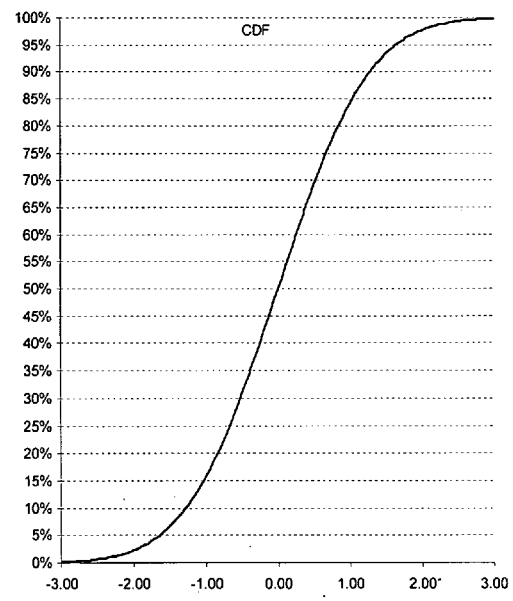
Fig. 10A
Fig. 10B
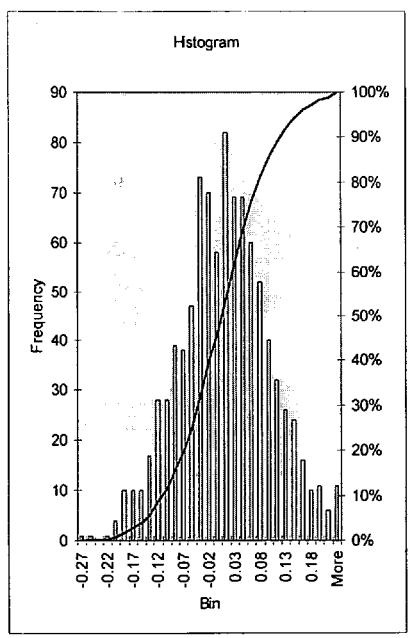
Fig. 10C
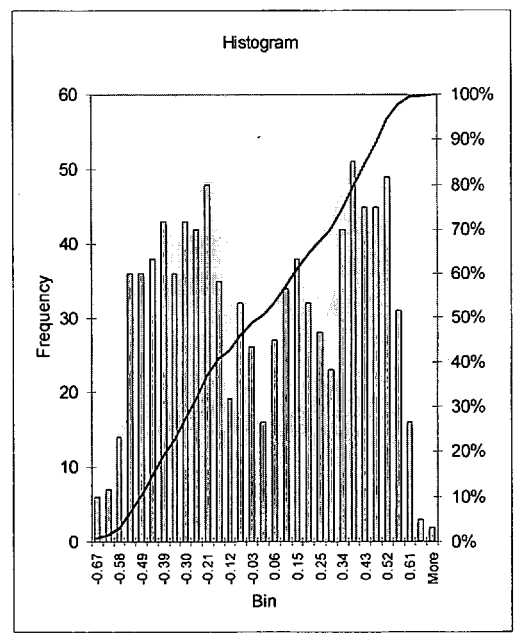

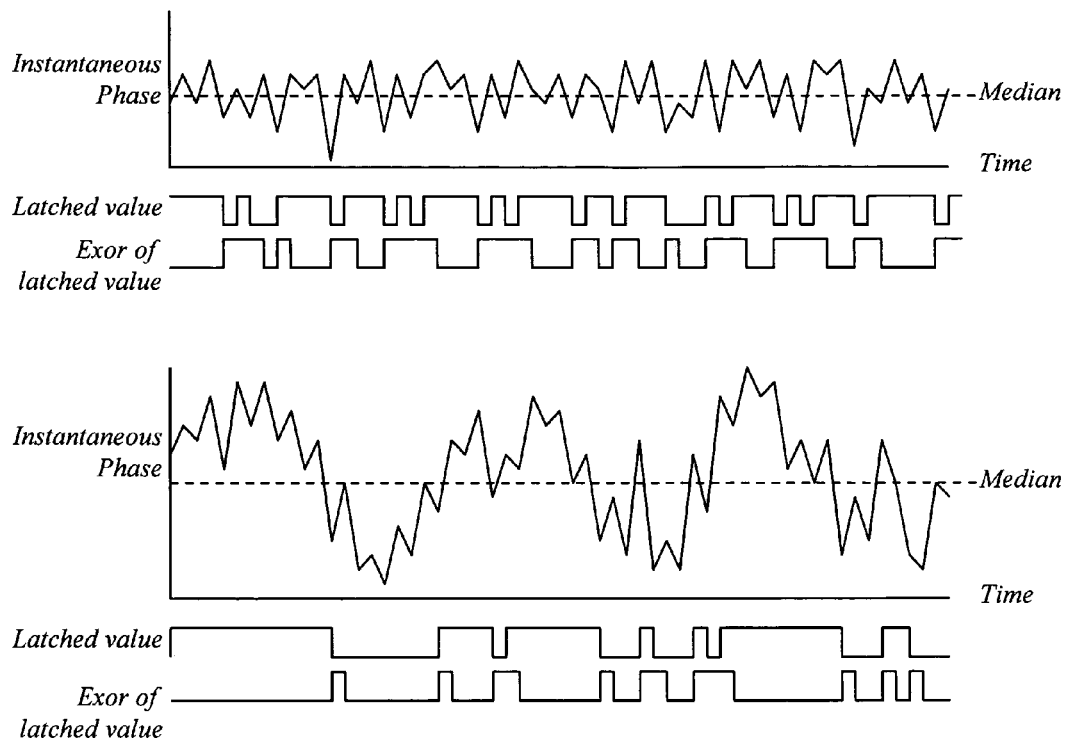
FIG. 12A
FIG. 12B
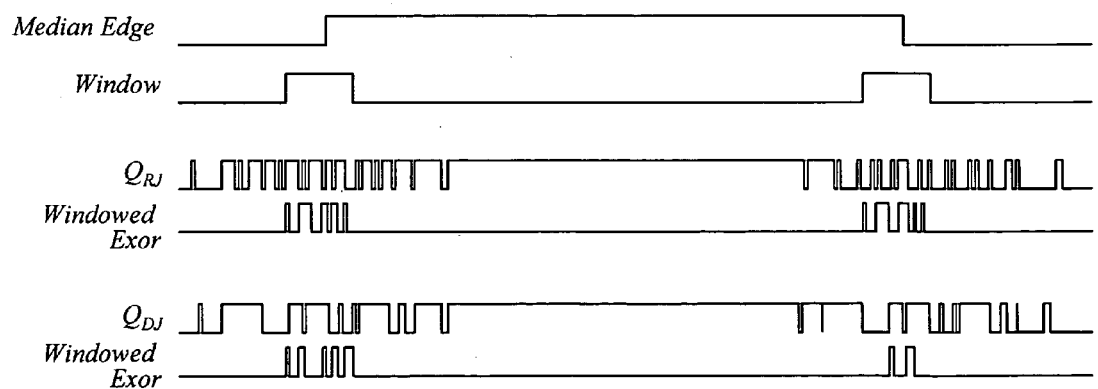

1. Measure PLL jitter vs Xtal2, with Xtal1 as PLL ref clk e.g., TX ref clk e.g., RX ref clk 2. Measure PLL jitter vs Xtal1, with Xtal2 as PLL ref clk 3. Measure Xtal1 vs Xtal2

CIRCUIT AND METHOD FOR MEASURING JITTER OF HIGH SPEED SIGNALS

CROSS-REFERENCE TO RELATED APPLICATIONS

This application claims the benefit of U.S. Provisional Patent Application Ser. Nos. 60/505,436 filed Sep. 24, 2003, 60/523,323 filed Nov. 20, 2003, 60/545,953 filed Feb. 20, 2004 and 60/558,102 filed Apr. 2, 2004.

BACKGROUND OF THE INVENTION

1. Field of the Invention

The present invention relates to test and measurement of signal timing jitter, especially for high-speed digital signals and circuits.

2. Description of Related Art

As the data rate of integrated circuit (IC) signals increases each year, it becomes more difficult to accurately measure timing parameters of the circuit signals.

Jitter is an especially important parameter that is more complex and expensive to test at higher frequencies, to the extent that it is sometimes impractical to test on every circuit manufactured. For very high speed data transmission (greater than one gigabit per second), the bit error ratio (BER) is typically specified as less than $10^{-12}$. Measuring this BER is impossible in a reasonable production test time (less than a few seconds), so measuring the jitter that causes bit errors is often the only alternative. However, the jitter standard deviation that corresponds to this BER is typically less than ten picoseconds, and is extremely difficult to measure accurately or quickly—a one picosecond error may correspond to 50% error. Measuring peak-to-peak jitter is unreliable because it is very dependent on the number of samples and measurements are not very repeatable (they may have variance that exceeds 50%) because single-shot events greatly affect the measurement.

Jitter is the variation in the rising and/or falling edge instants of a signal relative to the ideal times for these instants. FIG. 1 shows an example waveform that has jitter—its rising and falling edges fall at different times relative to a constant unit interval (UI); the differences are denoted in the figure as $t_0, t_1, t_2, \ldots, t_5$. The constant intervals are the ideal times. Peak-to-peak jitter for megahertz (MHz) signals is typically less than a few nanoseconds (ns), and for gigahertz (GHz) signals, it is typically less than a few tens of picoseconds (ps). Equipment that can measure picosecond jitter is typically quite bulky (more than a cubic foot), and connections between this equipment and a circuit-under-test (CUT) must be made very carefully to minimize the effect on the signal under test and the measurement accuracy.

Oscilloscopes measure jitter by triggering on a first transition of the signal under test, and then capturing subsequent samples of the signal at a very high, effective sampling rate compared to the signal frequency. Timing measurement units (TMUs) measure jitter by phase locking their internal PLL to the signal under test, and then measuring each of the signal's transition time deviations ($t_0, t_1, t_2, \ldots, t_5$) with a precision delay line. Some oscilloscopes also use a PLL, and sometimes it is implemented in software (a "golden" PLL) that analyzes a previously captured set of data points. Spectrum analyzers measure jitter by analog demodulating each portion of the high frequency signal's bandwidth (whose total bandwidth of interest is centered around 1 GHz, for example) to a constant low center frequency (zero or 100 kHz, for example) and continuously measuring the phase and/or magnitude of the resulting continuous-time low frequency signal as the demodulating frequency is swept from one end of the total bandwidth to the other end. Connecting measurement equipment to a gigahertz signal typically affects the signal's signal level because of the non-infinite AC impedance of the connection, and affects the signal's jitter because each change in characteristic impedance along the signal's path to the equipment can cause reflections and changes in the signal's transition times.

A very high speed, low jitter oscilloscope or off-chip time measurement unit, which can cost more than $30K, or a long test time on automatic test equipment (ATE) that typically costs more than $1M.

Several built-in self test (BIST) circuits for measuring jitter have been reported (for example, U.S. Pat. No. 6,396,889 by Sunter et al, and U.S. Pat. No. 6,295,315 by Frisch et al) but they require a programmable delay line or a matched pair of oscillators. These are difficult to implement with low jitter (lower jitter than typical gigahertz signals) in the presence of typical circuit manufacturing-process variations and circuit noise. Some more-recent techniques demodulate a signal to a lower frequency to permit easier jitter measurement. U.S. Patent Application No. US-2002/0176491, by Kleck et al, uses analog demodulation to convert a high frequency signal to a lower frequency signal, and then performs conventional jitter measurement on the low frequency signal. U.S. patent application US-2002/0136337, by Chatterjee et al, describes how a jittered clock is connected to an analog-to-digital converter (ADC) having many bits of resolution, and the ADC samples a known jitter-free analog sine wave to produce a jittered digital output for which analysis of the binary-encoded sine wave reveals the amount of jitter in the clock.

PCT Application No. WO 99/57842, by Brewer et al, and U.S. Patent Application US-2002/0118738, by Whitlock, describe a method in which a clock is generated at a predetermined frequency offset (difference) from a clock-under-test, and the phase of the clocks is compared by counting the number of clock cycles occurring between instants at which an edge of one clock coincides with an edge of the other clock, and the minimum and maximum counts are recorded. This technique is too simple for many applications—it only measures peak-to-peak jitter, which is usually too variable to be a reliable parameter for production testing, and requires too long a test time to obtain reliable results for low jitter systems. It is preferable to be able to measure the standard deviation of the jitter to enable an estimate of long term peak-to-peak jitter, and to measure the frequency content of jitter. Measuring high frequency (HF) jitter separately from low frequency (LF) jitter is important because many high speed data transmission standards specify the tolerable amount of jitter as a function of frequency. For example, the separation between HF and LF jitter is typically specified as the data rate frequency divided by 1667 (or 2500). This corner frequency will typically be programmed as the loop filter frequency for the measurement unit's golden PLL.

When measuring jitter, it is important that random jitter be measured separately from deterministic jitter. Typically, this is done by analyzing the jitter histogram to see what Gaussian distribution best-fits the left and right tail-off in the histogram. A typical technique for reducing electro-magnetic interference in gigahertz signals is to modulate the transmit clock frequency with a much lower frequency, for example 30 kHz. Thus, in addition to measuring the level of deterministic jitter, it is often important to measure the modulating waveform's shape.

In addition to testing transmitted jitter of a high-speed data transceiver, it is also necessary to test a receiver's jitter and ensure that the receiver is sampling its input data in the middle of the signal eye opening. This is typically done by a jitter tolerance test, in which a specific amount of jitter is added to the input data signal and the BER is verified to be better than some threshold. This test requires very precise edge placement and high frequencies which add significantly to the complexity and cost of a tester.

In summary, prior art jitter measurement techniques require a precision delay line or analog circuitry, or only measure peak-to-peak jitter, and test equipment is only able to measure the jitter on signals that it can access, and the access connection may increase the jitter.

It will be seen that there is a need for a simpler, lower cost technique that accurately measures jitter using circuitry that can tolerate manufacturing process variations and has minimal or no impact on the signal under test.

SUMMARY OF THE INVENTION

It is an objective of the present invention to test circuitry that generates and receives signals that have jitter, especially high frequency digital signals, using the generation and receiving circuitry itself with minimal additional on-chip circuitry and inexpensively available off-chip circuitry.

One aspect of the present invention is generally defined as a circuit for measuring a statistical value of jitter for a data signal having a data rate, $f_D$, the circuit comprising a clock generator for generating a clock signal having a rate, $f_S$, where $f_D/f_S$ is a constant non-integer ratio; digital latching circuitry for latching the data signal using the clock; and analysis circuitry for computing jitter based on output data of the latching circuitry and the values of $f_D$ and $f_S$.

Another aspect of the present invention is generally defined as a method for measuring a statistical value of jitter for a data signal having a data rate, $f_D$. The method comprises sampling the data signal at a sampling rate, $f_S$, where $f_D/f_S$ is a predetermined non-integer ratio; and analyzing sample values to deduce the statistical value of the jitter.

In a preferred embodiment of the present invention, the circuit includes two frequency generators which generate unequal frequencies, $f_D$ and $f_S$ that connect to the data and clock inputs of latching circuitry whose output data is routed to an analysis circuit. There may be a CUT between one or both of the frequency generators and the latching circuitry. The latching circuitry may be part of a CUT. The data input to the latching circuitry is the result of a single-ended or differential comparison between the input signal and a DC voltage, and a DC voltage offset may be added, single-endedly or differentially, to the data signal prior to the comparison. The analysis circuit computes jitter based on the output data of the latching circuitry and the values of $f_D$ and $f_S$. The circuit and method can measure jitter for clock or data signals, especially for a PLL or serializer/deserializer (SerDes) of an IC.

According to the method of the present invention, the ratio between the data rate, $f_D$, and the sampling rate, $f_S$, is a non-integer ratio equal to K±R, where K is an integer and 0<R<1. K is an under-sampling ratio, R is the measurement resolution relative to the unit interval (UI) of the data signal, and the UI is equal to the duration of one bit or symbol of the data signal, i.e., $1/f_D$. In other words, R is equal to $f_D/f_S$ minus the integer nearest to $f_D/f_S$. For example, if $f_D/f_S$=20.01, then K=20 and R=0.01. According to the invention, the value of R may be approximate within the range 0<R<1.

The waveform of the data input signal preferably comprises a periodic pattern: a continuously serially transmitted constant digital word, or a continuously serially transmitted digital word comprising bits that have a random value and bits that have a constant value. For a two-level signal, preferably two adjacent bits in every word have constant logic values of 01 or 10. Preferably, at least one bit is sampled in every word.

According to one embodiment of the method, peak-to-peak HF jitter is calculated by measuring the total time during which the latch output is unstable, relative to the total measurement time interval, over a sufficiently large time interval comprising at least 2/R cycles of $f_S$, where unstable means that the data bit stream is not a constant logic value for a predetermined number (that is based on the expected maximum number of unstable bits in a group) of consecutive samples. RMS HF jitter is calculated similarly except that unstable is redefined to mean the time interval that comprises a predetermined percentage, preferably 25%, of the unstable bits on either side of the median bit for each group of unstable bits.

BRIEF DESCRIPTION OF THE DRAWINGS

These and other features of the invention will become more apparent from the following description in which reference is made to the appended drawings in which:

FIG. 5 is a schematic of a circuit, according to an embodiment of the invention;

FIGS. 8A, 8B, and 8C show a schematic, state diagram, and waveforms of a median edge detector, according to an embodiment of the invention;

FIG. 10A-10C shows a graph of the CDF of an ideal Gaussian distribution vs. sigma, and graphs of two example probability distribution functions (PDF) or histograms, and their cumulative distribution functions (CDF);

FIGS. 12A and 12B shows waveforms that reveal a non-random or lower frequency component of a timing parameter distribution, according to an embodiment of the invention;

DETAILED DESCRIPTION OF PREFERRED EMBODIMENTS

In the following detailed description, numerous specific details are set forth in order to provide a thorough understanding of the present invention. However, it will be understood by those skilled in the art that the present invention may be practiced without these specific details. In other instances, well known methods, procedures, components and circuits have not been described in detail so as not to obscure aspects of the present invention.

An objective of the invention is to test jitter of signal waveforms, relative to predetermined test limits, to determine whether circuitry is free of manufacturing defects. A further objective is to measure the performance of circuitry for purposes of characterization or design validation.

Figure 1:
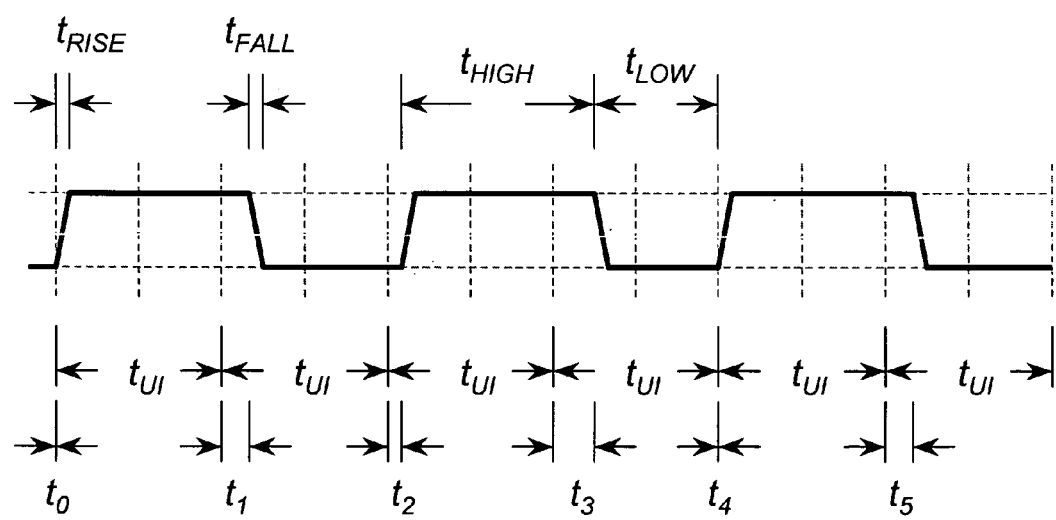
FIG. 1 illustrates some prior art timing parameters of a signal.
Figure 2A:
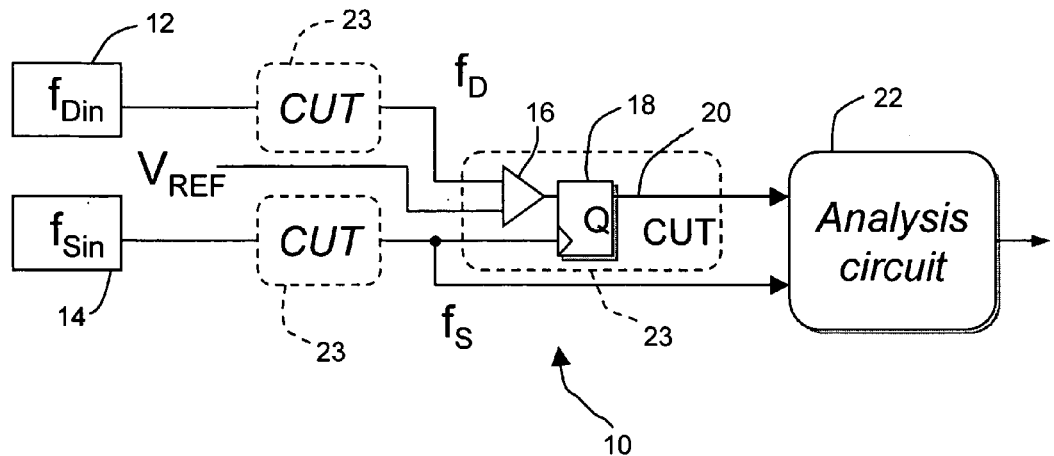
FIG. 2A is a schematic of a circuit, according to an embodiment of the invention.

An embodiment of circuit 10 of the present invention is shown in FIG. 2A. The circuit comprises a data clock generator 12 which generates a data signal having a frequency or data rate, $f_{Din}$, a sampling clock generator 14 which generates a data signal having a sampling frequency or rate $f_{Sin}$, a data voltage comparator 16, a latching circuit 18 whose data and sampling clock inputs receive frequencies, $f_D$ and $f_S$, respectively, and which outputs a latched data signal 20 and an analysis circuit 20. $f_D$ and $f_S$ have a non-integer ratio. The analysis circuit calculates jitter of the data signal, based on the output data from the latching circuit. The data signal is a periodic pattern of bits, comprising a constant data word repeated continuously or a data word in which all but two bits are random data with the two bits being two different logic values (01 or 10).

According to the method of the present invention, the ratio between the data rate, $f_D$, and the sampling rate, $f_S$, is a non-integer ratio equal to $K \pm R$, where K is an integer and $0 < R < 1$. K is the under-sampling ratio and therefore equal to the number of periods of $f_D$ between sampling instants, R is the measurement resolution relative to the unit interval (UI), and the UI is equal to $1/f_D$. In units of time, the measurement resolution equals $R/f_D$. Stated in the format typically used when describing coherent sampling, the ratio between $f_D$ and $f_S$ is equal to M/N, where $M=KR \pm 1$. N is an integer preferably between 10 and 10000, K is preferably an integer between 1 and 100, and R=1/N. This allows the data signal to be sampled coherently by the sampling clock, which means that the phase of the sampling clock and the phase of the data signal will align every N cycles of the sampling clock. According to the present invention (but not to conventional coherent sampling), the value of R may be approximate within the range $0<R<1$, hence N may vary slightly with time.

Figure 2B:
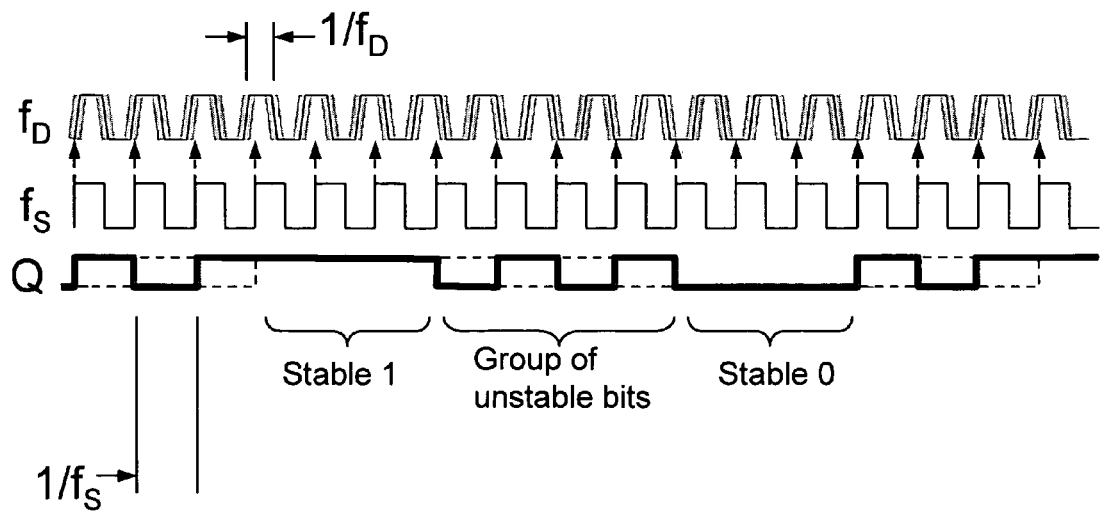
FIG. 2B shows example simplified waveforms of the circuit in FIG. 2A.

The fundamental frequency in the output signal (also called an alias or beat frequency) of the latch circuit is a low frequency version of signal $f_D$. In effect, signal $f_D$ is undersampled or demodulated by signal $f_S$, resulting in signal $f_D$ being shifted down in frequency according to conventional sampling and demodulation theory. This allows low frequency digital and/or analog analysis circuitry to perform the analysis of the signal's timing parameters, which permits greater measurement accuracy and use of lower cost circuitry. However, conventional analysis cannot be performed on signal Q, the output of latching circuit 18, because each edge of $f_D$ becomes a group of many edges in the down-shifted signal Q due to jitter, as shown in the waveform of FIG. 2B.

In a preferred embodiment, analysis circuit 20 is clocked using the same clock as the latching circuit and is a synchronous finite state machine (FSM). FIG. 2B shows example waveforms for the circuit of FIG. 2A, where data rate $f_D$ is slightly greater than twice frequency $f_S$ (and therefore K=2). Note that the Q waveform is inverted if $f_D$ is equally slightly less than twice $f_S$. When the periodic pattern is two bits long (1010 . . . ), the latch circuit output, Q, will have a fundamental frequency equal to $Rf_S/2$, and the frequency will vary if $f_D$ and $f_S$ are not exactly constant. Jitter in $f_D$ or $f_S$ will cause quantized jitter-like unstable time intervals in the latch circuit output, as shown in FIG. 2B, which is referred to herein as groups of unstable bits. Some of the bits during the unstable interval will be logic 1 and some will be logic 0. If the periodic pattern in $f_D$ is "1010", then W=2, where W is the number of bits in the periodic pattern, and this is equivalent to a 50% duty cycle clock signal having frequency $f_D/2$; it is also equivalent to a periodic pattern of "11001100" clocked at twice the rate (and W=4). The corresponding pattern in the Q output will have a frequency of $Rf_S/W$.

Jitter is defined as variations in the edge timing of a waveform, relative to the ideal timing—the "jitter" in the Q waveform shown is not jitter according to this definition because all of the edges occur at the same time relative to $f_S$, and comprise multiple transitions within each cycle of the demodulated waveform. Normally these multiple transitions are filtered out using analog or digital means because they cause conventional digital analysis methods to fail. The method of the present invention analyzes these multiple transitions to determine the jitter in signal $f_D$ (and unavoidably, to some extent, also in signal $f_S$), and to determine the mean or median time of each group of edges.

In its simplest implementation, the CUT blocks 23, shown in dashed outline in FIG. 2A, are simply wires, and the jitter of signal $f_{Din}$ is measured. In another implementation, signal $f_{Din}$ controls the signal generated by a CUT, and the signal output of the CUT is measured instead of $f_{Din}$. Similarly, signal $f_{Sin}$ might control the signal generated by a CUT, and the signal output of the CUT is the sampling clock instead of $f_{Sin}$. The latching circuit might be part of a CUT. In any embodiment that involves a CUT, the measured performance will be dependent on the CUT and can therefore be a test of the CUT. The CUT could be a PLL which generates a frequency that is A/B times its input frequency, where A and B are integers.

Figure 3:
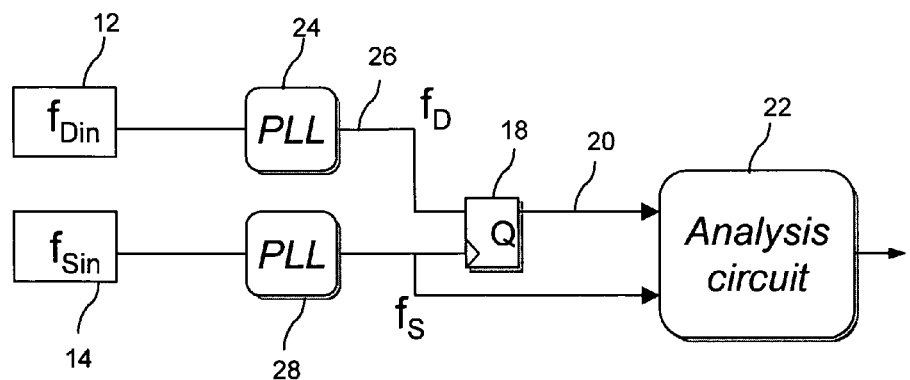
FIG. 3 is a schematic of a circuit, according to an embodiment of the invention.

In the example circuit of FIG. 3, a clock with frequency $f_{Din}$ drives a PLL 24 whose output 26 with frequency $f_D$ is the data input to a latch 18 (which inherently embodies a comparator), and a clock with frequency $f_{Sin}$ drives a PLL 28 whose output frequency $f_S$ is the clock to latch 18. The frequencies $f_{Din}$ and $f_{Sin}$ could be less than 100 MHz, whereas either (or both) of the PLL output frequencies could be gigahertz signals. The fundamental frequency of the latch output will be equal to $Rf_S$. For example, if $f_{Din}$ is 10.00 MHz, and $f_{Sin}$ is 9.99 MHz, and both PLLs multiply their input frequency by 1000, then the data input $f_D$ to the latch will be 10.00 GHz and the clock input $f_S$ will be 9.99 GHz, and the output will be clocked at 9.99 GHz and contain data that appears as a 0.01 GHz (=10 MHz) signal frequency. Some ICs contain several PLLs. The technique of the present invention allows each PLL to test another PLL, by connecting one PLL to $f_{Sin}$ and another to $f_{Din}$, and using the output of one PLL to latch the output of the other PLL. The latch output data can be analyzed, according to the present invention, to measure the relative jitter of both PLLs. If their relative jitter is below some limit, then the absolute jitter of each PLL is also below that limit (assuming their jitters are uncorrelated).

In the example circuit of FIG. 4, $f_{Din}$ drives a PLL 30 that generates a higher frequency $f_D$ which subsequently clocks latch 18 generating serial data at that higher rate. Similarly, $f_{Sin}$ drives a PLL 32 whose higher frequency output $f_S$ clocks latch circuit 18, whose data input is the high speed serial data. The output of the latch circuit is the demodulated data, at a low frequency as previously described.

For example, if the data word "11010100" is transmitted repeatedly (1101010011010100 . . . ) at a rate of one bit per period of $f_D$, then the output of the latch will be the same data sequence at a rate of one bit per period of $Rf_S$. The latch output will change from stable (consecutive equal logic values) runs of bits to unstable (non-deterministic) runs of bits, and the analysis circuit measures (by counting $f_S$ clock cycles) the duration of the unstable runs, and the duration of the measurement, to be able to compute the jitter.

Figure 4:
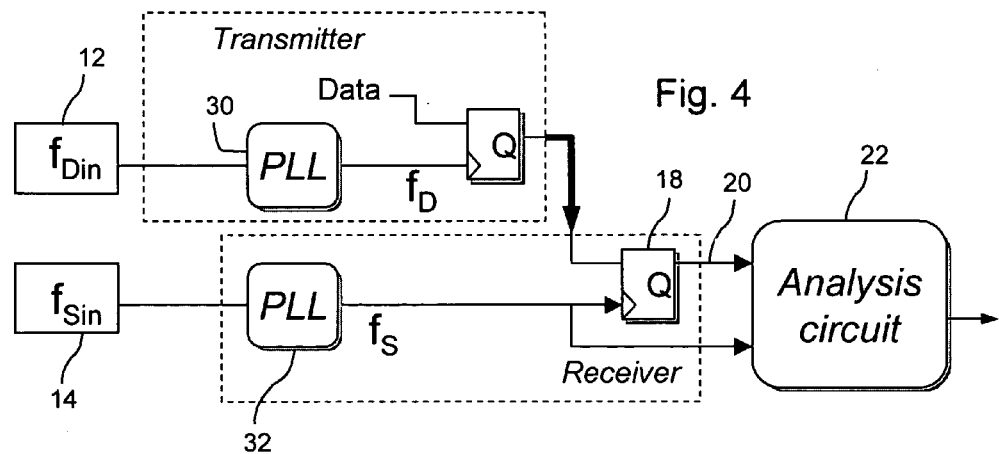
FIG. 4 is a schematic of a circuit, according to an embodiment of the invention.

The example circuit of FIG. 5, is similar to that of FIG. 4, except that a conventional serializing W-input multiplexer 36 and a conventional de-serializing W-output de-multiplexer 38 are provided. Any output bit of the W-bit register (not shown) is connected to the analysis circuit. Serializer 40 accesses each of the bits in sequence in a W-bit word and transmits them serially. Deserializer 42 delivers each of the bits in a sequence of W bits into a W-bit wide register. Conventionally, a serial data latch is clocked by a deserializer PLL 44 that phase-locks to the incoming serial data. Also conventionally, during an initialization mode, when an initialize signal 46 is logic 1, a multiplexer 48 selects a reference clock $f_{Sin}$ input instead of the serial data so that deserializer PLL 44 first frequency-locks to an approximately correct frequency signal ($f_{Sin}$), and then when Initialize is logic 0 locks to the phase of the serial data (at $f_D$). However, according to an embodiment of the present invention, an initialization-like mode is used during jitter measurement, in which the PLL is enabled to phase-lock to $f_{Sin}$ instead of $f_D$. A clock output from the PLL is divided down by a factor of W to obtain a clock 48 for synchronously analyzing the bits from one of the outputs from the W-bit de-serializer 42.

Figure 6A:
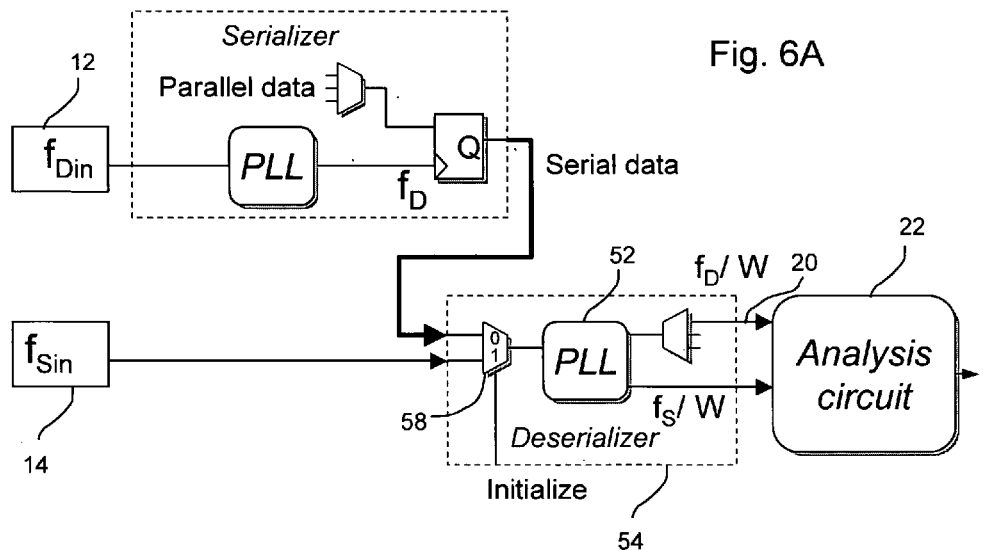
FIG. 6A is a schematic of a circuit, according to an embodiment of the invention.
Figure 6B:
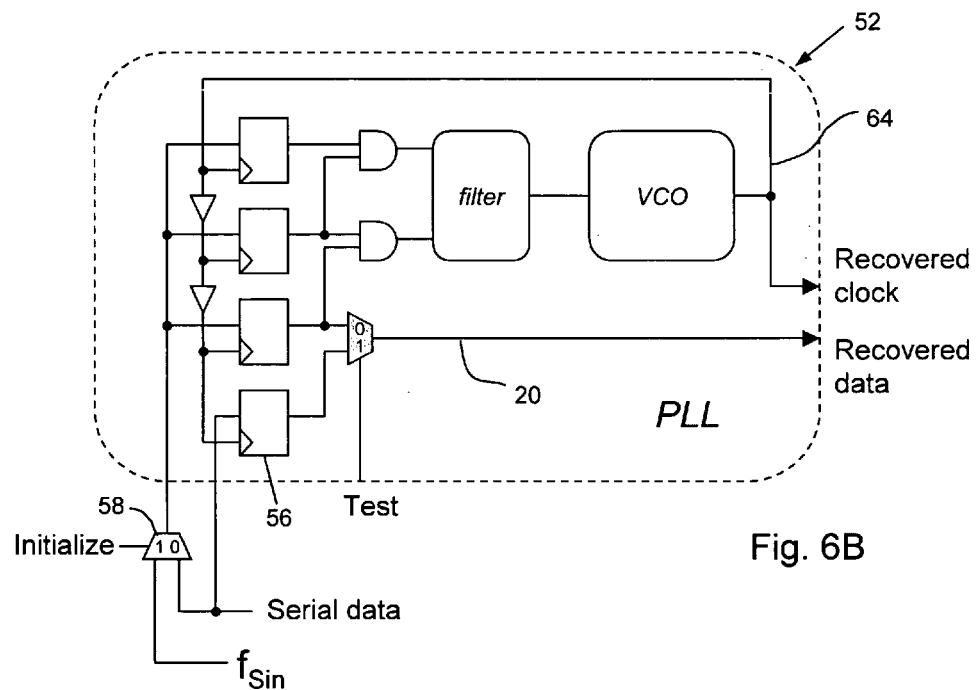
FIG. 6B is a schematic of a PLL connected according to an embodiment of the invention.

Referring to FIG. 6A, in some de-serializers, a PLL 52 provides the latched recovered data in addition to a phase-locked recovered clock, as shown by de-serializer 54. For these cases, an alternative circuit can be used to ensure that the PLL locks to $f_{Sin}$ instead of $f_D$. The schematic of FIG. 6B shows typical details for this type of PLL (having a "bang-bang" phase detector). The recovered data itself is normally used to provide feedback to improve the timing of the recovered clock. According to the present invention, a latching circuit 56 can be added to recover data from the serial data, $f_D$, instead of $f_{Sin}$, when Initialize is logic 1. Multiplexer 58 is the typical means to provide the initialization. The recovered clock in this mode is derived from $f_{Sin}$ so that demodulation occurs. When the PLL 52 is in normal operation (Initialize=0), the PLL recovers data and clock from the serial data.

Figure 6C:
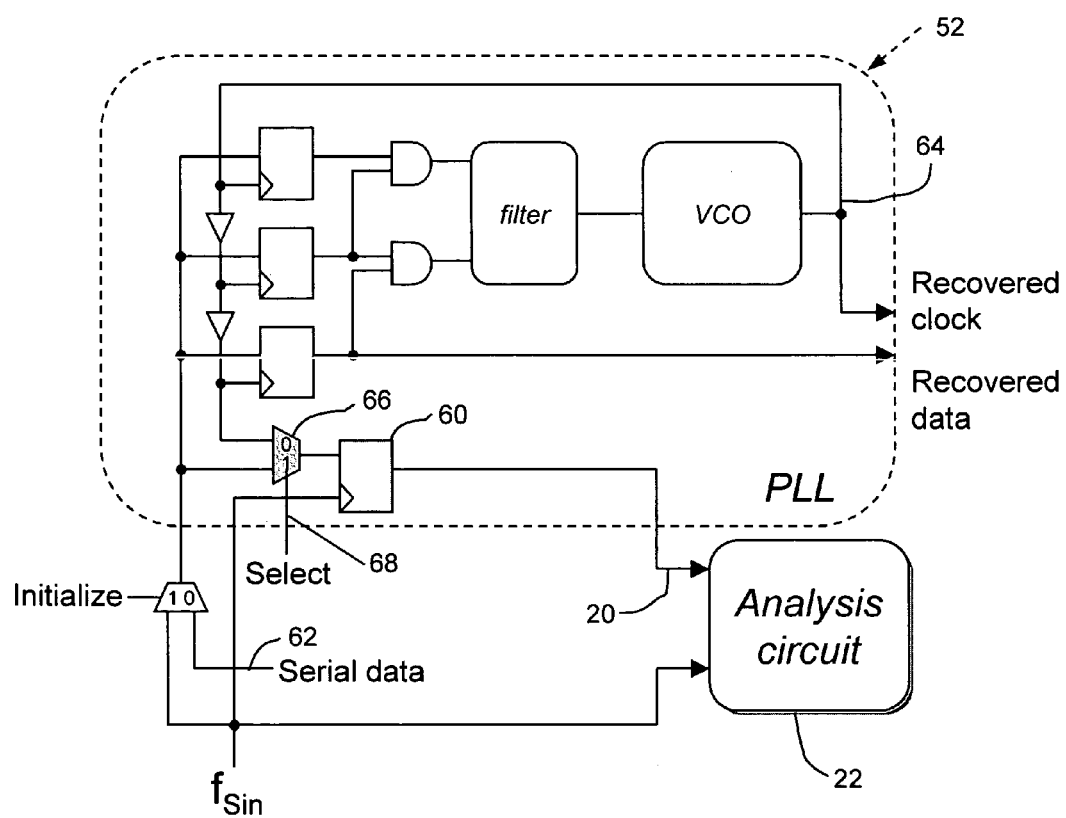
FIG. 6C is a schematic of a PLL connected according to an embodiment of the invention.

The schematic of FIG. 6C shows alternative, less-intrusive connections to a bang-bang phase detector. The latch 60 samples the serial data signal 62 or the recovered clock 64, via multiplexer 66 controlled by a Select signal 68.

Figure 7A:
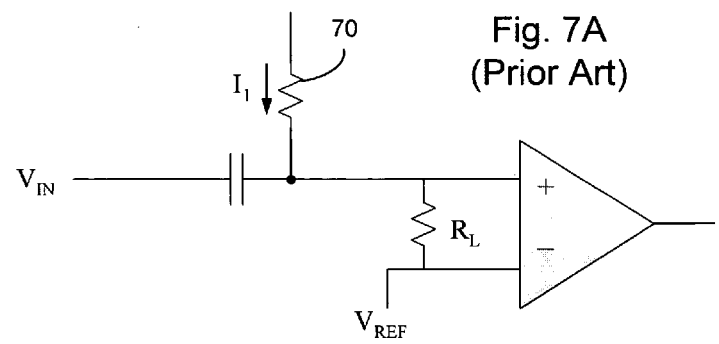
FIG. 7A is a schematic of a prior art bias circuit that facilitates measurement of transition time for single-ended signals.
Figure 7B:
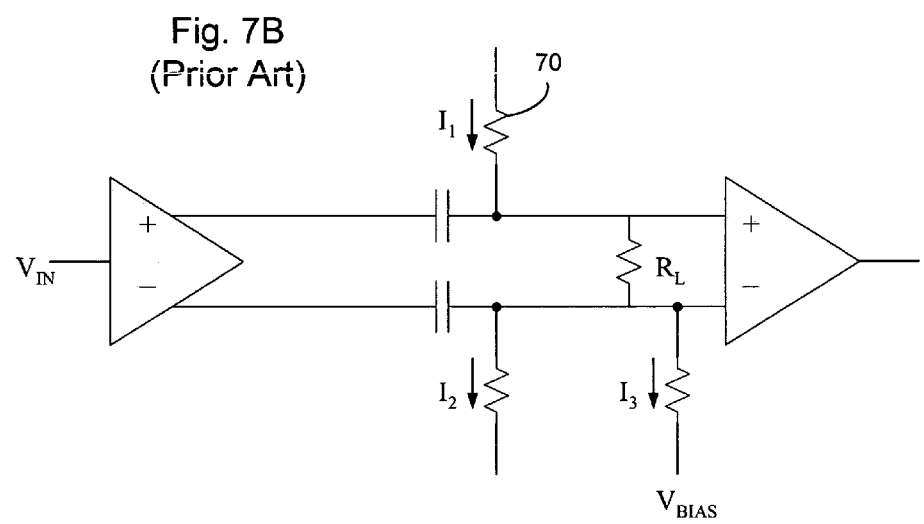
FIG. 7B is a schematic of a prior art bias circuit that facilitates measurement of transition time for differential signals.

The voltage threshold to which the serial data signal ($f_D$) is compared, to convert it into logic values and sampled, is normally a middle level of the waveform if the signal is differential. If the serial data signal is single-ended, the threshold will be either a reference voltage, $V_{REF}$, connected to a comparator, or the inherent threshold of a logic gate. In either case (differential or single-ended), the threshold can be changed. If the signal is AC-coupled, as shown in FIG. 7A, then an offset voltage can be injected by injecting current $I_1$ via a resistor 70 (a resistor value greater than $100*R_L$ will reduce the transmission line impact of connecting another signal to the comparator input to less than 1%). The current can be injected using a voltage or current source. For the AC-coupled differential case, current can be injected into one leg of the differential pair and an equal current ($I_2=I_1$) removed from the other leg of the differential pair, as shown in FIG. 7B. This has the effect of injecting a differential offset equal to $I_1*R_L$, and the effect will be independent of the bias network connected for functional purposes (a single resistor, conveying current $I_3$, is shown as an example). Typically a slightly different current will flow from each leg of the differential pair into the bias voltage (the net current flow is represented as $I_3$), however by forcing $I_1$ to equal $I_2$, the net current $I_3$ will be zero. The forcing is easily done with a commercial parametric measurement unit (PMU) which is available on any or all channels of most commercial ATE.

Other ways to cause a differential DC offset include adjusting the reference voltage of each leg of the differential pair, and adjusting the bias current of each leg of the differential comparator. It is also possible to adjust the effective bias voltage without injecting an offset voltage: the proportion of logic ones in the data stream can be adjusted to a non-50% value. For example if the data comprises a repeated data word of 01000 (four logic 0's and one logic 1; a 20% duty cycle), then, after steady-state is achieved, the waveform at the non-inverting input to the comparator will be shifted down in voltage relative to $V_{REF}$, the waveform at the inverting input to the comparator will be shifted up. The proportion of logic 1's in a pseudo-random bit pattern can also be adjusted to cause a desired offset across the AC-coupled connection.

Analysis

The analysis of the latching circuit output data to measure jitter, according to the present invention, will be described next.

Figure 8C:
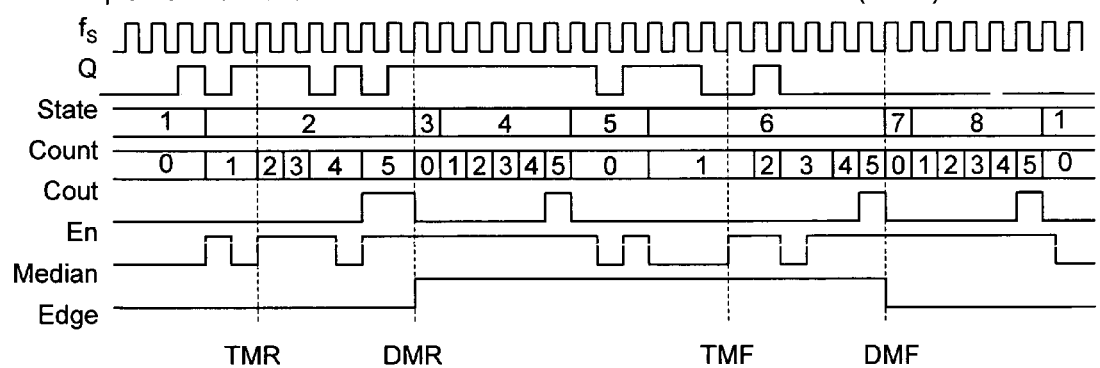

The circuit of FIG. 8A derives a "jitter-free" version of the input signal, $f_D$, that has no unstable intervals if the duration of each group of unstable bits in the latched data signal 80 (Q) is less than or equal to twice the maximum number of counts of a synchronous counter 84. A state machine 86 has a state diagram shown in FIG. 8B. The inputs to the state machine are latched data signal 80 of the latching circuit, a carry-out, Cout, of the synchronous counter which indicates that the counter has reached its maximum count, and sampling clock $f_S$. The outputs of the state machine are an enable signal, En, to enable the counter to count cycles of sampling signal, $f_S$, a reset signal, Rs, that resets counter 84 to its zero state, and a MedianEdge signal 94 which rises shortly after the median of the rising of the signal 80 is detected and falls shortly after the median of the falling edge of signal 80 is detected, as shown in the waveforms of FIG. 8C. The "short" interval is equal to the maximum number of counts, J, of the counter, plus or minus one. The value of 2 J is made equal to the expected maximum range of unstable bits, which corresponds to the expected maximum peak-to-peak jitter: specifically, 2 J is made equal to peak-to-peak jitter (in units of time) divided by the measurement resolution $R/f_D$. If any unstable bits occur outside this expected range, the circuit will provide a less accurate estimate of the jitter's statistical value. In the FIG. 8C waveforms, the true median rising edge is indicated by TMR, the output delayed median rising edge is indicated by DMR (delayed by the short interval), and likewise TMF and DMF for the falling edges. The unstable regions are shaded in the Q waveform for clarity.

The waveforms in FIG. 8C are for a counter 84 whose maximum number of counts is 6. The waveforms show an unstable region for the rising edge that is 8 cycles long. For the output median edge signal to have the same period as that of signal Q, the duration of stable bits must be at least equal to the maximum number of counts of the synchronous counter, and the total number of logic 1's between the median rising edge and median falling edge (and logic 0's between the median falling edge and median rising edge) must be at least equal to twice the maximum number of counts of the synchronous counter. The waveforms in FIG. 8C show a stable 1 region that is only 8 cycles long, but there are fourteen 1's between medians.

For many distributions of unstable bits, the median edge and the mean edge are approximately the same, but detecting the median edge position is generally simpler, as the state machine of FIG. 8A-8C shows. The present invention contemplates a circuit that detects the mean edge location, but is more difficult to design, and simulations show that the added complexity does not improve accuracy significantly.

Figure 9:
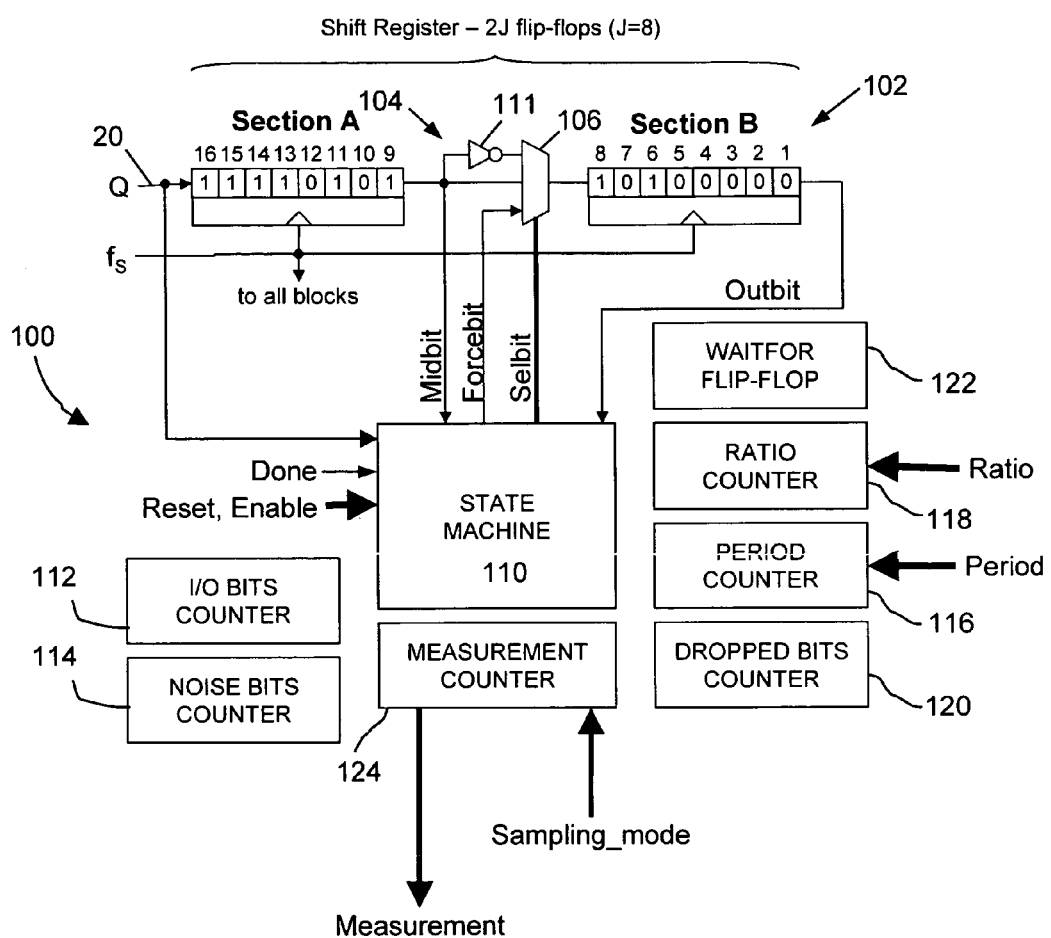
FIG. 9 is a schematic of a circuit, according to an embodiment of the invention.

FIG. 9 shows a general purpose circuit 100 according to an embodiment of the present invention that can be used to measure jitter for both rising and falling edges. The circuit incorporates the circuit of FIG. 8A. The circuit includes a shift register 102 having a length which should be long enough to contain the peak-to-peak noise (jitter) present on each "edge" (i.e. rising and falling edges) of beat frequency signal Q. However, if the noise is too large, this can be detected and corrected by increasing the difference between the sampling clock and the sampled signal. Shift register 102 is divided into two equal parts or registers, labeled sections A and B, of J bits, for a total length of 2 J bits. To simplify counting, J is preferably a power of 2. To find the median of the noise (jitter) bits on each edge of the beat frequency signal, signal Q, is fed into section A and "expected" value bits (1 for a 0-to-1 edge, or 0 for a 1-to-0 edge) are counted until J expected values have entered the shift register. This technique automatically centers the median of the noisy bits at the interface between sections A and B of the shift register because an extra shift will occur whenever a non-expected value enters section A. Eventually, for all the expected values that overflow into section B, there will be an equal number of non-expected values that will remain in section A, thus separating the "noise" at the median.

All the blocks of circuit 100 in FIG. 9 are driven by the sampling clock, $f_S$. 2 J-bit shift register 102 is fed by latched output Q of latching circuit 18. As mentioned above, the shift register is divided into two sections, sections A and B, of equal length of J bits each. Select logic 104, in the form of a multiplexer 106, connects the serial output of section A and the serial input of Section B of shift register 102. The multiplexer is controlled by control signal, Selbit, output by a four-state State Machine 110 which controls the various operations of jitter measurement. The states of the state machine are described below. The latched output Q and the serial output of Section A are both input to the state machine. The output of section A is a signal labeled Midbit. Midbit is also applied to the input of an inverter 111 whose output is applied to one input of select logic 104. A Forcebit signal output by the state machine is connected to another input of the select logic.

An I/O bits counter 112 counts bits shifted into and out of the shift register, depending on the state of the state machine as described later. Counter 112 corresponds to synchronous counter 84 in FIG. 8A. A noise bits counter 114 counts either the bits which cross the interface between sections A and B of shift register 102 or the bits to consider during the jitter period measurement, depending on the state of the state machine, as explained later. A period counter 116 counts sampling clock cycles up to a number defined by input Period, which defines a measurement period. A ratio counter 118 splits the counting of noise bits which cross between sections A and B between noise bits counter 114 and a dropped bits counter 120. Dropped bits counter 120 counts the number of bits to ignore at the output (tails) of the shift register. Preferably, the value of Ratio is programmable from 1/8 to 7/8 in increments of 1/8. The value remains constant throughout the specified measurement period defined by input Period.

A Waitfor flip-flop 122 is controlled by state-machine 110 and specifies the transition of the beat frequency to expect next. The value of the Waitfor bit is 1 when a 0-to-1 transition of the beat frequency is expected and 0 when a 1-to-0 transition is expected. A Measurement Counter 124 accumulates the number of cycles of sampling signal $f_S$ during which groups of sampled values are unstable. The final count of the measurement counter at the end of the measurement period is output as signal Measurement. Measurement counter 124 is enabled only when the period count has not elapsed and the state machine is enabled and is disabled depending on the value of a two-bit Sampling_mode signal. When Sampling_mode is 0, the jitter on both "edges" of signal Q is measured. When Sampling_mode is 1, only the rising "edge" of signal Q is measured, which means that Waitfor is 1. When Sampling_mode is 2, only the falling edge of Q is measured, which means that Waitfor is 0. The following four paragraphs describe each of the four states of state machine 110 of FIG. 9. The four states of state machine 110 are described below and correspond loosely to the left (Waitfor=1) or right (Waitfor=0) sides of the simpler state machine illustrated in FIG. 8C. It will be understood that the number and functions of the various states may vary depending on the specific statistical values of jitter are to be measured. The states described below is one example of state machine states.

State 1—Waiting for Steady-State

The state machine enters State 1 when reset signal, Rs, is applied. This resets all counters and the Waitfor bit to respective predetermined values. Waitfor is initially set to the complement of the value that will be used in States 2, 3 and 4. The state machine remains in State 1 as long as enable signal, En, is low.

When En is asserted, the I/O bits counter is continuously reset until J consecutive bits corresponding to the Waitfor value have been received at the serial input of Section A of the shift register. The Waitfor bit is now toggled in order to detect the opposite transition on latched output Q in the following state. The J consecutive bits ensure that a sequence of stable values have been shifted into the section A register. Thus, depending on the original value of Waitfor, Section A may contain all zeroes or all ones. All other counters are reset/preset in preparation for receiving the expected edge from output Q. The state machine then proceeds to State 2 described below.

State 2—Receiving an "Expected Edge"

State 2 performs three functions: it receives/detects a Waitfor edge in latched output signal Q, determines a median edge of an unstable group of bits in the latched output signal and classifies noise bits into bits that will be used in generating the measurement output and bits that will be excluded from the measurement.

The state machine remains in State 2 until J bits of Waitfor have been received from latched output Q (the J bits do not need to be consecutive). This will indicate that the Median Edge of a group of unstable bits has been detected. The J bits are counted by I/O bits counter 112.

Meanwhile, the Selbit value is set so that Midbit is input to Section B of the register via the select logic. Period counter 116, previously preset to the total measurement period, is enabled. This counter counts down until it reaches zero, indicating that a measurement period has ended, and then signals this condition to the state machine.

Noise bits are classified as either a "main body" bit or a "tail" bit depending on the proximity of the bit from the median. The calculation of jitter, as described below in the description of State 3. For every Midbit value that has a value equal to the expected value, Waitfor, ratio counter 118 outputs control signals to noise bits counter 114, which counts main body bits, and dropped bits counter 120, which counts remaining fraction bits, so that they will be enabled based on the value of Ratio (1/8, 2/8 . . . 7/8) selected. For example, if Ratio is 3/8, the noise bits counter will be enabled 3/8 of the time and the dropped bits counter will be enabled 5/8 of the time. When the noise bits counter is enabled, it is incremented by 2 for every Waitfor value received from Q. When the dropped bits counter is enabled, it is incremented by 1 for every Waitfor value received from Q.

When J bits of value Waitfor have been received from Q, the state machine proceeds to State 3 (dropping "tail" bits). I/O bits counter 112 is set to count 2 J bits (this is the total length of the shift register).

State 3—Dropping "Tail" Bits

Tail bits are bits that are removed or spaced from the median edge by more than a predetermined amount.

The state machine remains in State 3 until the dropped bits counter counts down to zero from the value accumulated in State 2. Period counter 116 remains enabled continuously. During this state, Selbit is set so that the complement of Midbit feeds the input of section B of the shift register. For every Outbit of value equal to the expected value, Waitfor, dropped bits counter 120 is decremented by one. I/O bits counter 112 is decremented on every cycle of the sampling clock.

The state machine proceeds to state 4 (measuring the jitter period) when dropped bits counter 120 reaches zero.

State 4—Measuring the Jitter Duration

Measurement counter 124 is enabled when the first Outbit value that matches Waitfor is received by the state machine and remains enabled until the noise bits counter 114 has decremented to zero from the value counted in State 2. The noise bits counter is decremented for each Outbit value that matches Waitfor.

When the noise bits counter reaches zero, the I/O bits counter is reloaded with count J repeatedly until J consecutive Q bits of value Waitfor have been received. These tasks are complete when the noise bits counter and the I/O bits counter have counted down to zero, which means that a measurement phase is complete and a stable state of the expected transition, Waitfor, has been achieved on Q. At that time, the Waitfor bit is toggled in preparation for receiving the next "edge" on Q and the counters are reset/preset as they were in State 1 just before entering state 2. The state machine now proceeds to state 2. States 2, 3 and 4 are repeated in sequence until the period counter has decremented to zero. This will result in a number of Measurement values depending on the measurement period specified.

With the algorithm described above, whenever a "low noise" or "noise free" edge is received, the median of the noise bits would not be detected when executing States 3 and 4. This is a consequence of feeding the complement of the Midbit signal into the section B during these states, which would result in all ones being output. This situation is corrected by forcing the first bit of Section B of the shift register to a zero by causing the select logic to select the Forcebit signal. This is implemented in State 2 of the state machine and occurs whenever the noise bits counter is zero, the next bit to be received on Q is Waitfor, and it is the last Waitfor bit to receive. The state machine can proceed to State 3 with assurance that there will always be at least one "noise" bit output at Outbit even when the noise bits and, possibly, the dropped bits counters are zero at the end of State 2.

The RMS value of the jitter (or sigma) can be deduced, for random jitter, from a cumulative distribution function (CDF) for the jitter by measuring the time interval between two limits in the jitter CDF. If the lower limit is set to (50%–34.1%)=15.9% and the upper limit is set to (50%+34.1%)=84.1%, the time interval measured between these two limits corresponds to twice the standard deviation of the distribution, if the jitter's probability density function has a Normal (or Gaussian) distribution. The value 34.1% comes from a standard statistical table for the Cumulative Normal Frequency Distribution, for sigma=1, as shown in the graph of FIG. 10A. Thus, dividing the measurement output by measurement counter 124 by two gives the standard deviation.

For sigma=2, the value from the table is 47.7%, thus setting the lower limit to (50%–47.7)=2.3% and the upper limit to 97.7%, and dividing the measured value by four will also yield a value for sigma (the standard deviation). Similarly, almost any percentiles can be used and converted to an estimate of sigma—the examples given here only correspond to integer numbers of sigma. The circuitry may be simpler if powers of one half are used as the percentiles. For example, for one eighth, the percentiles may be chosen from the following: 12.5%, 25%, 37.5%, 50%, 62.5%, 75%, and 87.5%. These are the values used in the implementation of FIG. 9.

The average jitter measured for 2 to 3 sigma limits provides a more accurate summary of the jitter range than the peak-to-peak value measured over a short time interval because the value will have less variance than the peak-to-peak value. This is also true when the jitter distribution is not Normal.

According to an embodiment of the invention, the jitter interval is measured for two different pairs of limits, for example 25% and 75%, and 12.5% and 87.5%, and the difference between the two results is compared to the difference expected for a Normal distribution. If the comparison (subtraction) between the two differences exceeds some threshold (for example, 10% of the Normal difference), the jitter is deemed to be not Normal.

It is informative to plot the probability density function (PDF), or histogram, of the jitter, as can be seen in the graphs shown in FIG. 10B and FIG. 10C. Engineers can then see whether the distribution is in fact Normal, bi-modal, or has some other distribution. The value of sigma derived from the CDF, as described in the previous paragraphs, only corresponds to sigma when the distribution is Normal. For other distributions, there are standard formulae to calculate sigma if the whole distribution is known. From the prior art, sigma squared, which is the variance, is equal to the mean square value minus the squared mean value. The mean square is equal to the average squared bin position, with each squared position weighted (multiplied) by its bin value ("Frequency" or number of occurrences). The squared mean value is equal to the average bin position with each position again weighted (multiplied) by its bin value ("Frequency").

Figure 11:
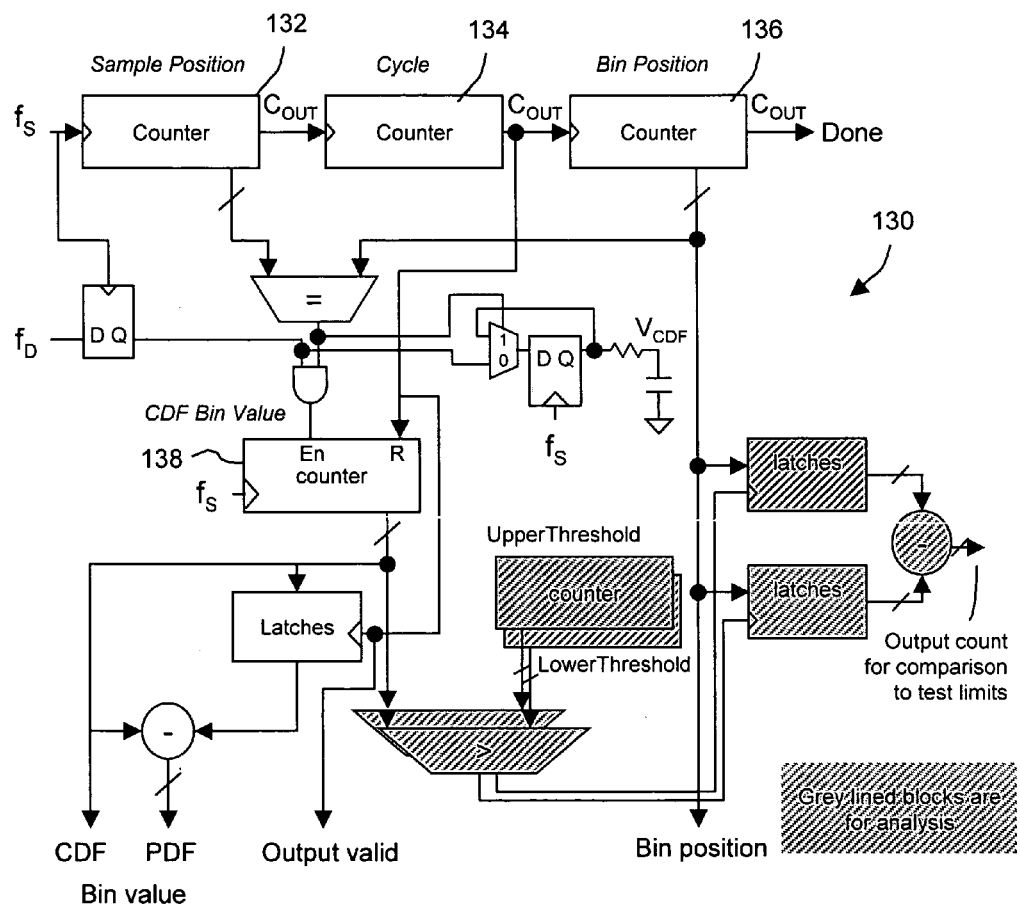
FIG. 11 shows a schematic of a circuit that outputs digital and analog data that can be used to display or compute properties of the PDF or CDF of a timing parameter, according to a preferred embodiment of the invention.

A circuit 130 illustrated in FIG. 11 can be used to produce the CDF and PDF of the jitter, according to an embodiment of the present invention. A Sample Position counter 132 counts cycles of $f_S$, and its count represents the present sampling position within each cycle of $f_D$, and outputs a carry out ($C_{OUT}$) pulse once per cycle of the beat frequency $Rf_S/W$. During each carry out pulse, a cycle counter 134 increments by 1. The cycle count represents the number of times that the present position has been sampled within the $f_D$ cycle, and when it reaches a predetermined maximum number of samples per bin, the carry out signal is pulsed and the count returns to zero for the next position within each cycle of $f_D$. The carry out from the Cycle counter increments a Bin Position counter 136, and indicates that outputs of a CDF Bin Value counter 138 and a Bin Position counter 136 are valid, and resets the CDF Bin Value counter. The Bin Position count represents the bin whose value is presently being measured. When the Bin Position counter reaches its maximum count, it outputs a carry out pulse to indicate that all values for the PDF or CDF have been output. The CDF Bin Value counter increments whenever the Sample Position count is equal to the Bin Position count and logic 1 is detected at the latching circuit output. To calculate a PDF, each CDF Bin Value counter is subtracted from the previous value, for a rising edge (or vice versa for a falling edge). The percent value of each bin, for the CDF, is equal to the Bin Value divided by the (predetermined) maximum Cycle count. To create a graph of the PDF or CDF, each Bin Value that is output (when the Output Valid signal is pulsed) represents a vertical axis value for the Bin Position value (on the horizontal axis) that is output simultaneously. The width of each Bin Position, in units of time, is equal to R multiplied by the UI, where the UI is in units of time.

The circuit of FIG. 11 may also include circuitry to compare the present CDF Bin value to thresholds, and the time interval between crossing a first threshold and crossing a second threshold will be proportional to sigma for a Gaussian distribution, or proportional to peak-to-peak jitter when the lower limit is set to one and the upper limit is set to the maximum Cycle count subtract one. The circuit of FIG. 11 is able to compute the PDF and CDF in a way that permits real time viewing on a low frequency oscilloscope. The output of the comparator that generates the Enable to the CDF Bin Value counter can also be connected to a latch-and-hold circuit whose output is connected to an RC low pass filter (shown in FIG. 11) and the resultant analog voltage corresponds to the CDF. If two comparators with adjacent Bin Position counts (i.e. differing by one count) are used, each connected to a latch-and-hold circuit, and two low pass filters, then the difference between the two resultant voltages will correspond to the PDF (histogram)—this difference can be monitored using a differential oscilloscope probe or by using the oscilloscope to display the difference between two probe inputs in real time, allowing a user to modify the circuit under test and observe the changing histogram on a low speed oscilloscope.

In the circuit of FIG. 9, the CDF values can be derived by latching the value of a specific shift-register bit position, each time the median is detected between sections A and B—this is a static location relative to the median—for some number of beat frequency cycles, and then a next shift register position is observed. The result is that the latched output, after RC low pass filtering to produce an analog voltage, corresponds to the PDF (histogram).

The number of edges of $f_D$ occurring is indicative of the amplitude of low frequency jitter content, as shown in FIG. 12A. The circuit of FIG. 9 can output an exclusive-or signal that is proportional to the number of bit transitions (instead of a number of ones or a number of zeroes). Optionally, the jitter interval signal can enable counting of the number of edges only within a time window around the median transition. As shown in FIG. 12B, edges in the data signal that are within the window (which will tend to be symmetrically placed around the derived median edge) are counted via an exclusive-or gate whose two inputs are connected to the present bit and the previous bit—when the bits are the same the EXOR output is logic 0, when the bits are different the EXOR output is logic 1 and enables the edge counter. After edges are counted for a suitably large number of windows (for example, 1000), the total count is proportional to the amplitude of the low frequency content. Excessive low frequency content is indicative of deterministic jitter.

Peak-to-peak jitter can be measured by counting the number of $f_S$ cycles in each unstable region (the shaded region of the example waveform of FIG. 8C) and recording the maximum such count in a measurement interval. In a preferable alternative circuit, peak-to-peak jitter is measured by counting (in a first counter) the number of $f_S$ cycles from the start of each unstable region to its median edge, and (in a second counter) from each median edge to the end of each unstable region. Each first counter output is stored in a first latch if it is larger than any previously latched count, otherwise it is ignored. Each second counter output is similarly stored in a second latch. At the end of a measurement interval, the two stored largest counts are summed to produce the peak-to-peak jitter count.

Figure 13A:
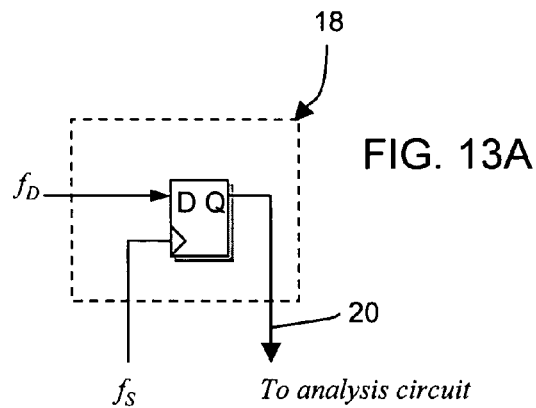
FIG. 13A-13C shows schematics of timing measurement probes, according to an embodiment of the invention.
Figure 13B:
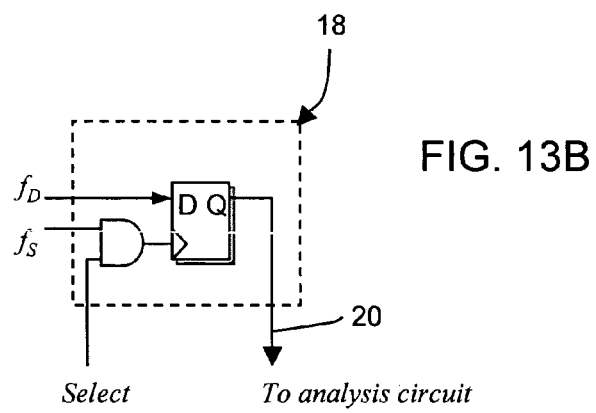
Figure 13C:
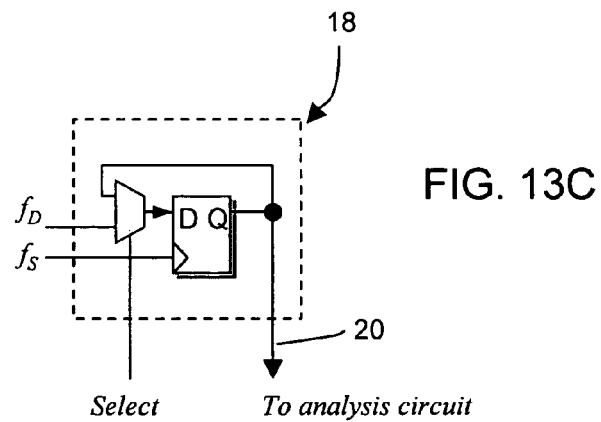

Jitter can be measured for many signals using a common analysis circuit and sampling "probes" like those shown in FIG. 13A-13C. Each probe circuit has two connections to the common analysis circuit, one that enables the sampling and one that conveys the resultant samples to the analysis circuit. The signal that enables sampling may be the sampling signal itself (FIG. 13A) or a Select signal (FIG. 13B or FIG. 13C). The circuits that use a Select signal can be expected to dissipate less power when they are not involved in a measurement, and the Select signal can be the output of a combinational circuit that decodes a binary-encoded address. The probe output samples can be conveyed to the common analysis circuit directly, via a common bus, via a multiplexer, or via a shift register (for example, a scan path). None of the signals has critical timing or required delays; however, any jitter on the $f_S$ signal will contribute to the measured jitter.

Figure 14A:
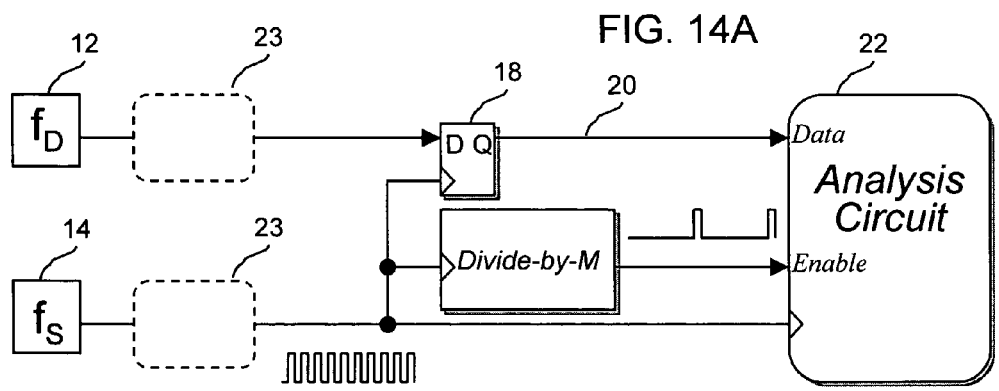
FIG. 14A-14B shows schematics of circuits in which every $M^{th}$ sample is captured, according to an embodiment of the invention.
Figure 14B:
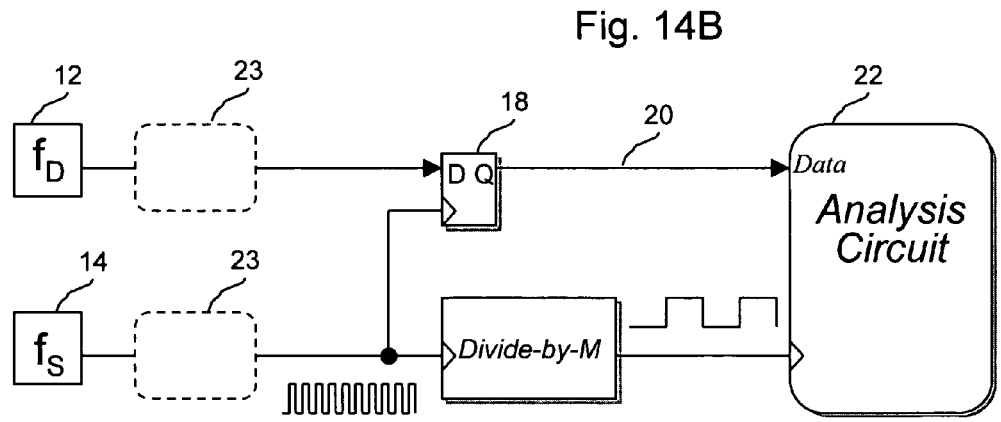

As mentioned previously, the output samples from the latching circuit can be further under-sampled. The schematics of FIG. 14A-B show two circuits that can perform this under-sampling. The circuit of FIG. 14A generates lower frequency pulses that periodically enable each of the synchronous functions within the analysis circuit. Each of the synchronous functions includes logic that holds the present state between enable pulses; however, the functions must still be capable of handling the pulse width of the $f_S$ clock.

The circuit of FIG. 14B uses a frequency divider 140 that may be asynchronous and hence operate at higher frequencies than the divider of FIG. 14A. This type of divider provides a lower frequency clock (with any duty cycle) for the analysis circuit, and hence the analysis circuit can use slower logic and consume less power than the analysis circuit of FIG. 14A.

Figure 15A:
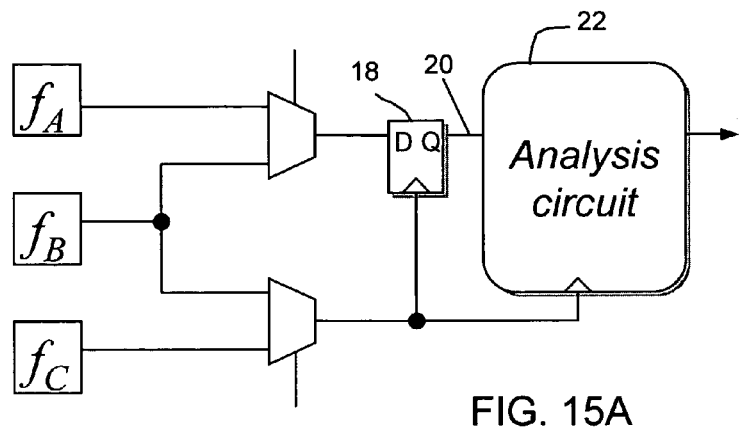
FIG. 15A shows schematics of circuits that enable measurement of the jitter in each of multiple frequency sources, according to an embodiment of the invention.

The schematic of FIG. 15A shows a circuit that measures the jitter in a frequency source, according to an embodiment of the invention. As stated previously, when a jitter measurement is performed upon signal $f_D$ using $f_S$ as a sampling clock, the resulting measurement is equal to the jitter of $f_D$ relative to $f_S$, which is the sum of the two jitters if they are uncorrelated signals (or more correctly, the sum of the two jitter powers—they must be added in a square-law fashion). To measure the jitter in $f_D$ or $f_S$ alone, an extension to the method is needed—a third frequency signal that is uncorrelated to the first two frequencies is needed. FIG. 15A shows three frequencies, $f_A$, $f_B$ and $f_C$, where each is related to the other two by the relationship prescribed earlier for jitter measurement—the ratio must be non-integer. In addition, it is assumed that each signal's jitter is uncorrelated to the jitter of the other two signals. Any two of these three signals could be $f_S$ and $f_D$. According to the method, first the jitter of $f_A$ is measured using $f_B$ as the sampling frequency; the measured variance is $v_{AB}$ (which is equal to the square of the standard deviation). Then, the jitter of $f_B$ is measured using $f_C$ as the sampling frequency; the measured variance is $v_{BC}$. Then, the jitter of $f_A$ is measured using $f_C$ as the sampling frequency; the measured variance is $v_{AC}$. The following three equations summarize the results:

$$v_{AB} = v_A + v_B$$

$$v_{BC} = v_B + v_C$$

$$v_{AC} = v_A + v_C$$

These three equations can be solved as simultaneous linear equations because they are independent measurements.

Adding the first and third equations yields:

$$v_{AB} + v_{AC} = 2v_A + v_B + v_C = 2v_A + v_{BC}$$

Therefore, $v_A = (v_{AB} + v_{AC} - v_{BC})/2$

Similarly, $v_B = (v_{AB} + v_{BC} - v_{AC})/2$ $v_C = (v_{BC} + v_{AC} - v_{AB})/2$ Thus, the absolute variance and standard deviation of the jitter of each signal can be measured. This can be extended to the measurement of jitter in many signals. For example, if ten frequencies are to be measured, the absolute jitter in one sampling frequency can be measured as explained, and then its value can be subtracted (or more exactly, its variance can be subtracted) from all other jitter measurements that use that signal as a sampling clock. It is possible to measure multiple combinations which result in multiple absolute jitter values for a single signal—the measurements should differ only because they are derived from a finite number of samples and because some of the signals might have some correlation; in any case, they can be averaged to produce a single result.

Figure 15B:
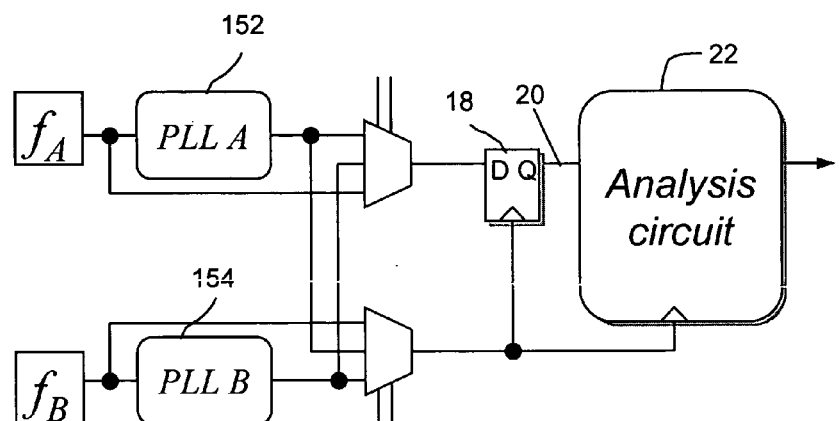
FIG. 15B shows a circuit that measures the jitter in two uncorrelated signals, according to an embodiment of the invention.

The schematic of FIG. 15B shows a circuit 150 that measures the jitter in two uncorrelated signals, according to an embodiment of the invention. In this case, the two signals, $f_A$ and $f_B$ are inputs to two PLLs 152 and 154. Multiplexers 156 and 158 select a sampling clock and select a signal to be sampled. If frequencies $f_A$ and $f_B$ are uncorrelated, then the PLL output frequencies can be uncorrelated (and the PLL output jitters can be assumed to be uncorrelated). The output frequency of a PLL is correlated to its input frequency; therefore, avoiding measuring the jitter of a PLL's output relative to its input. This means that four measurements are needed: measure the jitter of PLL 152 output relative to PLL 154 output; measure the jitter of PLL 152 output relative to signal $f_B$; measure the jitter of PLL 154 output relative to signal $f_A$; measure the jitter of $f_A$ relative to $f_B$. This leads to four simultaneous linear equations, with four unknowns, and can therefore be solved conventionally as demonstrated for three unknowns.

Figure 15C:
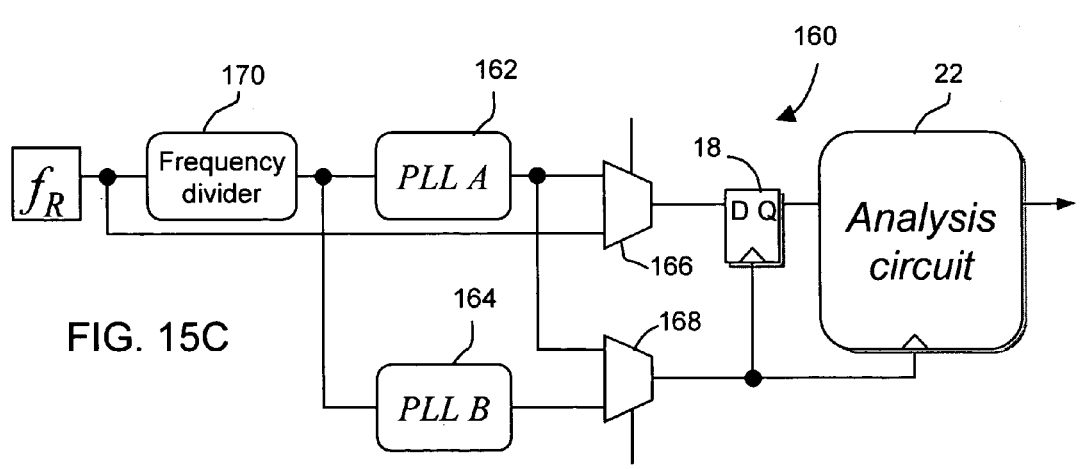
FIG. 15C shows a circuit that measures three relative jitters to permit calculation of each absolute jitter, according to an embodiment of the invention.

The schematic of FIG. 15C shows a circuit 160 that measures three relative jitters to permit calculation of each absolute jitter, according to an embodiment of the invention. This is similar to the circuit of FIG. 3, in which the circuits under test are PLLs and the PLL internal feedback dividers are chosen so that the output frequency of first PLL 162 divided by the output frequency of the second PLL 164 is a non-integer ratio. Multiplexers 166 and 168 select a sampling clock and select a signal to be sampled. For example, the first PLL multiplies its input frequency by 100, and the second PLL multiplies the same input frequency by 99. The common input reference frequency for the two PLLs is created by frequency divider 170 which divides a reference frequency, $f_R$, to obtain a lower frequency whose ratio to each of the PLL output frequencies is a non-integer. For the example, $f_R$, could be 101 times the common frequency. The three measurements needed are: measure the jitter of a first PLL output relative to a second PLL's output frequency ($v_{AB}$); measure the jitter of the reference frequency relative to the first PLL's output frequency ($v_{AC}$); measure the jitter of the reference frequency relative to the second PLL's output frequency ($v_{BC}$).

Figure 15D:
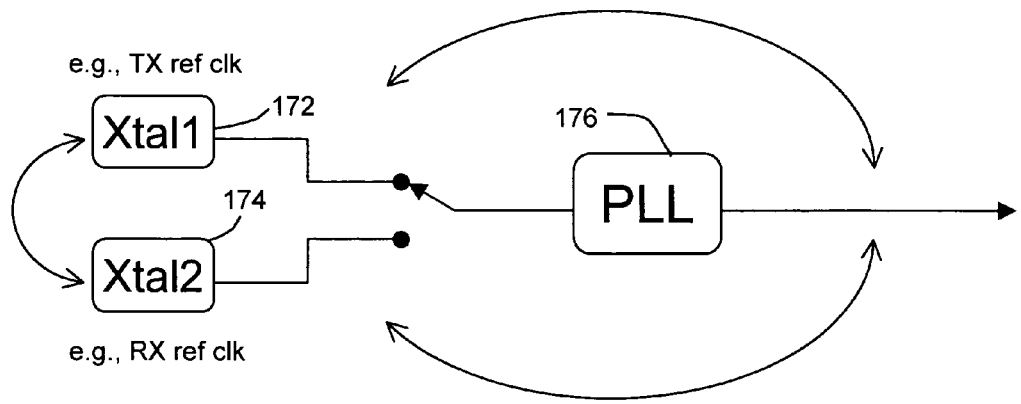
FIG. 15D shows an example embodiment of the method for a PLL that has two possible reference clocks generated by crystal oscillators.
Figure 15E:
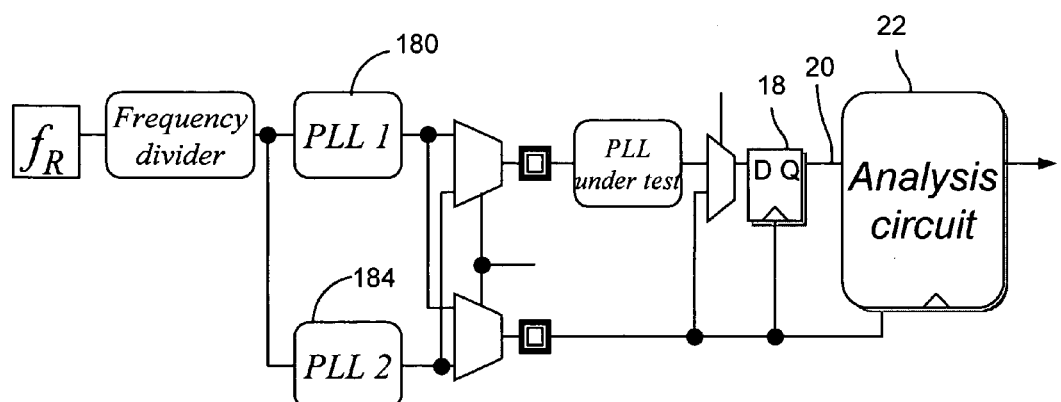
FIG. 15E shows a circuit implementation according to an embodiment of the invention, similar to FIG. 15C and FIG. 15D, in which the two reference clocks come from two PLLs, neither of which is the PLL under test.

FIG. 15D shows an example embodiment of the method for a PLL that has two possible reference clocks generated by crystal oscillators, where one is slightly offset in frequency relative to the other (by using a voltage-controlled crystal oscillator). While crystal oscillator 1 is the reference for a PLL, the relative jitter is measured between the PLL output and crystal oscillator 2. Then, while crystal oscillator 2 is the reference for a PLL, the relative jitter is measured between the PLL output and crystal oscillator 2. Then the relative jitter is measured between the crystal oscillator 1 and crystal oscillator 2. The three independent jitters can be calculated using the resulting simultaneous linear equations as described earlier. FIG. 15E shows a circuit implementation, similar to FIG. 15C and FIG. 15D, in which the two reference clocks come from two PLLs, neither of which is the PLL under test.

Figure 16:
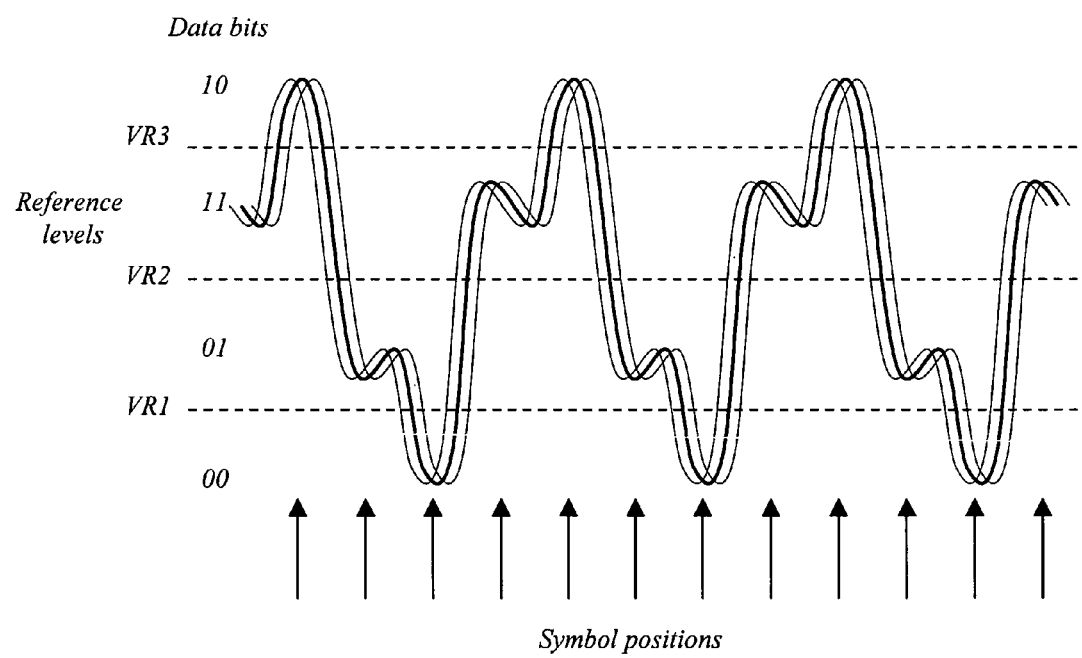
FIG. 16 shows a multi-level signal waveform, multiple reference voltages, and typical function-mode sampling instants.

Jitter can be measured for multi-level signals, as shown in FIG. 16, by measuring the jitter in the data bits derived from the multi-level signal by the function under test. Each level of a multi-level digital signal represents more than one bit (two bits in the example waveform of FIG. 16), hence bits are output in parallel, and transitions between some levels correspond to transitions in only one of the parallel bits. Thus, jitter is detected by monitoring the appropriate parallel latched bits for each level transition of interest. For example, to measure jitter at the threshold voltage VR3 between voltage ranges corresponding to 10 and 11, the parallel latched outputs of the analog receiver are combined using combinational logic that produces a logic 1 whenever its two inputs are 10, and logic 0 whenever its two inputs are 11. The combinational logic output is analyzed using the analysis circuit 20 in FIG. 2, 3, 4, 5, 6 etc.

Jitter can be measured in periodic analog waveforms, such as a sine wave, by converting it to serial bits, by using a sampling comparator with a single or multiple switching points, where the sine wave has frequency $f_D$ and the sampling converter is sampled at frequency $f_S$.

The jitter measurement method described thusfar measures relative timing jitter: the jitter in the data relative to the jitter in the sampling clock. As described, the jitter can be measured by capturing the unstable bits caused by the jitter, counting the number of clock cycles that contain X % of the captured unstable bits centered around the median, and accumulating this count for some number of unstable bit groups. The accumulated count, when divided by the total number of sampling clock cycles, is proportional to the RMS HF jitter and the UI. The jitter in this interval will be jitter that has a derivative greater than the beat frequency (which is equal to $Rf_S$): $2\pi f_J A_J > Rf_S$, where $f_J$ is the frequency of the jitter and $A_J$ is the jitter amplitude in UI at frequency $f_J$. $Rf_S$ was defined earlier.

According to a further embodiment of the present invention, the CDF of the HF jitter can be accumulated within a first portion of the analysis circuit, and then shifted at low speed to a second portion of the circuit for further analysis. In the first portion of the circuit, which contains a serial shift register, each bit of the 2 J bit (for example 128 bits) shift register 102, or every B bits (for example, 4 bits), is connected to a counter—there are many of these counters, for example 32 counters, each able to count up to, for example, 4095. Each time the median is detected in the captured unstable bits, the counters are enabled to count logic ones for the next B sampling clock cycles. After each group of unstable bits has been captured and all 32 counters have counted up to B bits, the counters are disabled until the next group of unstable bits is captured when its median is detected. Thus, after 1023 such groups have been captured, each of the 32 counters has an output count equal to a value between zero and 1023×B=4092, for example. The contents of all of the 32 counters are then shifted one after the other, at a slow clock rate, for example 10 MHz or the IEEE 1149.1 TAP clock rate. Each counter's output count corresponds to a bin of the CDF. During analysis in the second circuit portion, bins can be combined to provide noise averaging, and the difference between bins is used to generate the histogram. Examples of the CDF and histogram (PDF) are shown in FIG. 10A-10C. The advantage of this circuit is that a thousand groups of unstable bits can be processed at very high speed, and then only the resulting CDF data is shifted to the other portion of the analysis circuit (which could be on a separate IC). Thus, only a compressed version of the test data is shifted out of an IC.

While shifting the CDF data out, the RMS value can be calculated by comparing each count to target counts corresponding to 25% and 75% of maximum count. The number of bins between these two target counts, the bin interval, is proportional to the RMS value and the UI. The bins can be counted as the CDF data is shifted out, and the bin interval compared to an upper and lower test limit to generate pass/fail bits. Some testers only have a 1-bit capture memory, and these testers can only "understand" pass/fail bits—they cannot interpret a multi-bit CDF bin value.

Instead of shifting out CDF bin values (or histogram bin values), the unstable bits content of the capture shift register 102 can be shifted out instead, at low speed. This offers the advantage that any number of such groups of unstable bits can be counted, instead of less than 1024 as in the previous example. Along with each group of unstable bits shifted out, the number of sampling clock cycles since the last captured group median is also shifted out—in effect each count is a timestamp. This is necessary because many groups will have been missed while each group is shifted out at low speed, and the timestamp allows more complete reconstruction of the time sequence and jitter frequency information. Graphing the timestamps relative to a constant average interval between groups reveals the jitter modulation or low frequency jitter. For example (taken from a real hardware experiment):

TABLE 1

| Timestamps | Zero Offset | Differences | # of Periods | Nearest Integer | Remainder | Correction (Bits) |
|---|---|---|---|---|---|---|
| 9848504 | 0 | | | | | |
| 11173415 | −5603801 | 1324911 | 36.0069 | 36 | 0.0069 | 51.0 |
| 12498340 | −4278876 | 1324925 | 36.0073 | 36 | 0.0073 | 53.8 |
| 13860084 | −2917132 | 1361744 | 37.0079 | 37 | 0.0079 | 58.4 |
| 15221807 | −1555409 | 1361723 | 37.0074 | 37 | 0.0074 | 54.2 |
| 16546709 | −230507 | 1324902 | 36.0067 | 36 | 0.0067 | 49.2 |
| 1131190 | 1131190 | 1324902 | 36.0067 | 36 | 0.0067 | 49.2 |
| 2492912 | 2492912 | 1361722 | 37.0073 | 37 | 0.0073 | 54.0 |
| 3817862 | 3817862 | 1324950 | 36.0080 | 36 | 0.0080 | 58.8 |
| 5179623 | 5179623 | 1361761 | 37.0084 | 37 | 0.0084 | 61.8 |
| 6541361 | 6541361 | 1361738 | 37.0078 | 37 | 0.0078 | 57.2 |
| 7866270 | 7866270 | 1324909 | 36.0069 | 36 | 0.0069 | 50.6 |

The timestamps in the first column of Table 1 are from a counter that counts periods of the sampling clock. It rolls over to zero and continues counting after it reaches its maximum count. The timestamps are normalized to time zero by subtracting the first timestamp from all timestamps—this is the second column of Table 1. The difference between each adjacent pair of timestamps is calculated (third column) and then divided by the known (or estimated) base frequency period. This number (fourth column) is rounded to the nearest integer (fifth column). The remainder (sixth column) represents the median phase wander relative to the constant base frequency, and is multiplied by 1/R to convert to a number of histogram bin widths (seventh column), or cycles of $f_S$, or bits in the Q signal. The remainders are samples of a sine wave if the jitter was modulated by a low frequency sine wave.

To measure wideband jitter, each group of unstable bits is shifted left or right by the number of bits indicated by its remainder value in the seventh column of Table 1. Then the groups are accumulated to generate a histogram as described earlier for a median centered histogram (except this histogram is period centered), where the number of logic ones in each bit position is summed to produce the bin value. The RMS value can be computed from the histogram.

When the base (or beat) frequency ($Rf_S$) is known, the groups of unstable bits can be accumulated continuously into a CDF in the first portion of an analysis circuit. The median of the first group is used as time zero. Thereafter, at each edge of the known (or pre-determined) beat frequency, the group is captured and the bins of the CDF are incremented if its shift register bit position contains a logic 1.

Figure 22:
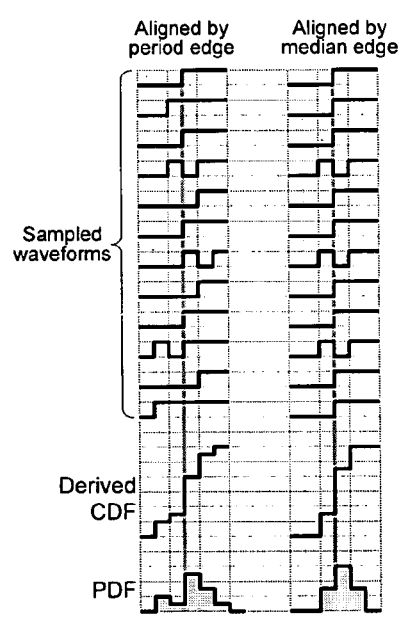
FIG. 22 illustrates how a wideband jitter and high frequency jitter CDF and PDF are derived from the same groups of unstable bits.

The illustration in FIG. 22 clarifies the difference between the wideband jitter measurement and the HF jitter measurement methods. The lefthand side of FIG. 22, shows how a dozen groups of unstable bits are accumulated and aligned according to their timestamps relative to a constant beat period to produce a period centered CDF and PDF (histogram) corresponding to wideband jitter. The right hand side shows how the same group of unstable bits is aligned by their medians to produce a CDF and PDF corresponding to HF jitter.

Figure 17:
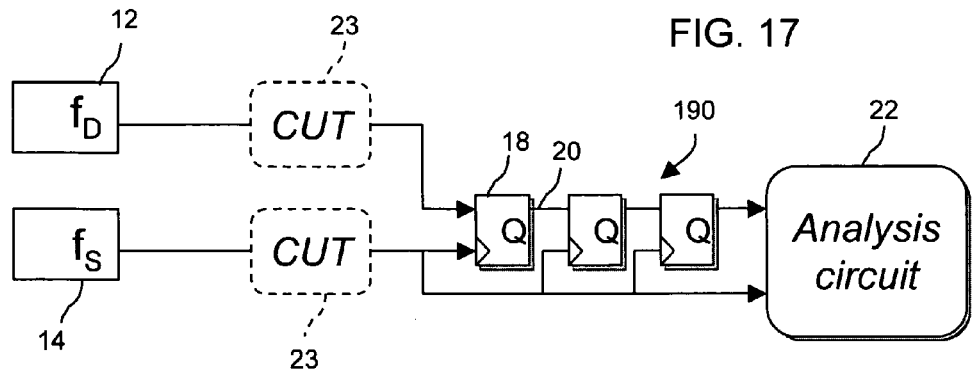
FIG. 17 is a schematic showing how the latched signal is subsequently latched multiple times to reduce the impact of metastability, according to a preferred embodiment of the invention.

Because the output of the latching circuit can occasionally be meta-stable when its input data edge exactly coincides with the active edge of $f_S$, additional latches 172 can be used, as shown in FIG. 17, to greatly reduce the likelihood of a meta-stable result reaching the ones counter.

Figure 18:
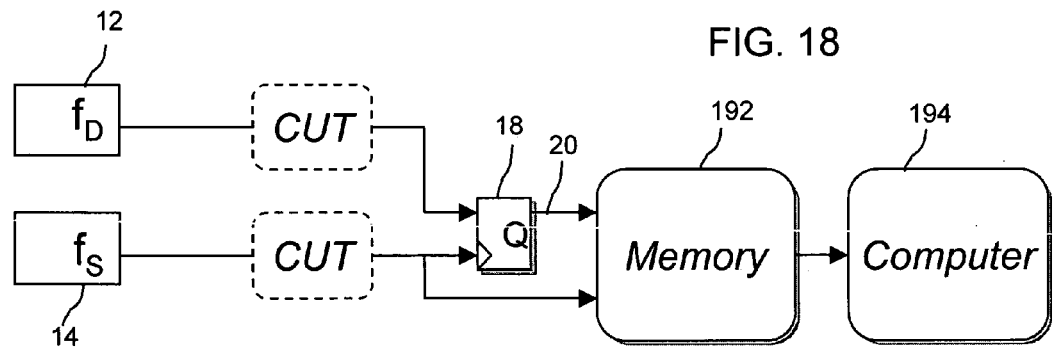
FIG. 18 is a schematic to show how the output of a latching circuit can be captured in a memory for analysis in a general purpose computer circuit.

As shown in FIG. 18, the output of the latching circuit can be captured in a memory 174 for analysis in a general purpose computer circuit 176, possibly at a later time.

Figure 19:
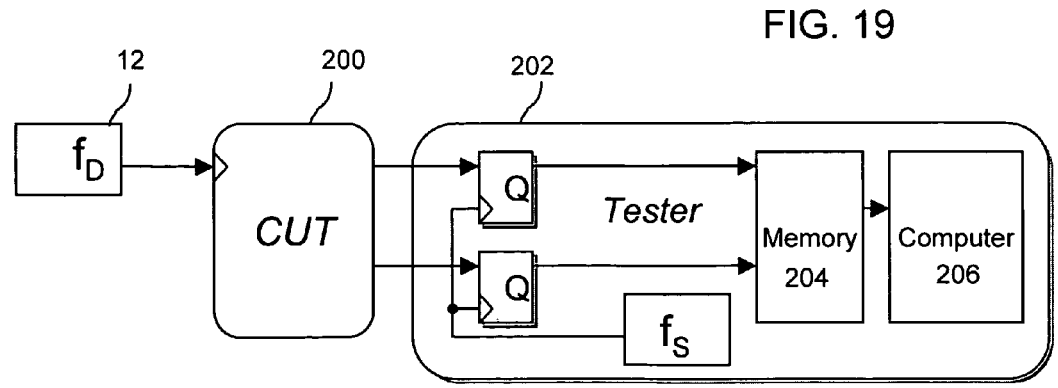
FIG. 19 is a schematic of a circuit to show how the clock $f_D$ for a CUT in an automatic test equipment (ATE) can be different from the ATE sampling clock $f_S$, so that any number of outputs from the CUT can be sampled in parallel and analyzed for jitter.

As shown in FIG. 19, the clock $f_D$ for a CUT 180 in an automatic test equipment (ATE) 182 can be different from the ATE sampling clock $f_S$, so that any number of outputs from the CUT can be sampled in parallel and analyzed for jitter. An ATE typically includes memory 184 for each pin channel and a general purpose computer 186.

The jitter measured will actually be the jitter of the data input to the latching circuit, relative to the clock input of the latching circuit. If $f_S$ has negligible jitter, the jitter in the latch output, as a portion of $Rf_S$, will be proportional to the jitter of $f_D$. If the jitter in $f_S$ is not negligible, the measured jitter will be the sum of the jitter of $f_D$ and $f_S$.

The data sequence that can be analyzed by the circuit of FIG. 9 must contain an periodic pattern (for example 0101, or 00110011), as previously described. A data sequence comprising a periodic pattern and random bits can be also be analyzed. According to the present invention, within each W-bit word, there are preferably two adjacent bit positions that always contains the same logic value. Preferably there are two adjacent bits that always contain 10, if falling edge jitter is to be measured, or 01 if rising edge jitter is to be measured and $f_D/f_S=K+R$ (if $f_D/f_S=K-R$, then sampled bits are inverted, as previously described). For example the word could be XXX01XXX, where each X represents a random (or pseudo-random) bit. The random bits will have no effect on the jitter measurement, when implemented as described herein, because jitter for only one edge type is measured and the other edge is ignored.

For serializers that encode the data, using for example 8B/10B encoding, the encoder should be bypassed. If the deserializer output data is used for the analysis, then the deserializer's decoder should also be bypassed. For serializers whose 8B/10B encoder cannot be bypassed, a periodic output can be generated for a constant input word if the serial data period is considered to be two words long because 8B/10B encoders alternate the encoded output between two words for any given input word (to maintain 50% average duty cycle).

If the data signal has an unknown frequency, its frequency can first be measured, and then the frequency of $f_S$ can be adjusted to achieve the correct ratio with $f_D$.

The value of R can be very close to zero (but not exactly zero). Another way to implement this frequency ratio, without using a programmable frequency generator or PLL, is to use a voltage-controlled delay line (VCDL) as is typically used in a delay locked loop (DLL). The delay line input frequency is $f_S$ (or $f_D$), and the delay line should have a delay range that exceeds two periods of this frequency. By voltage modulating the delay line's delay, the phase of the delay line's output can be continuously varied so that the sampling edge time-traverses the edge of the data and produces the data stream previously described.

Figure 20:
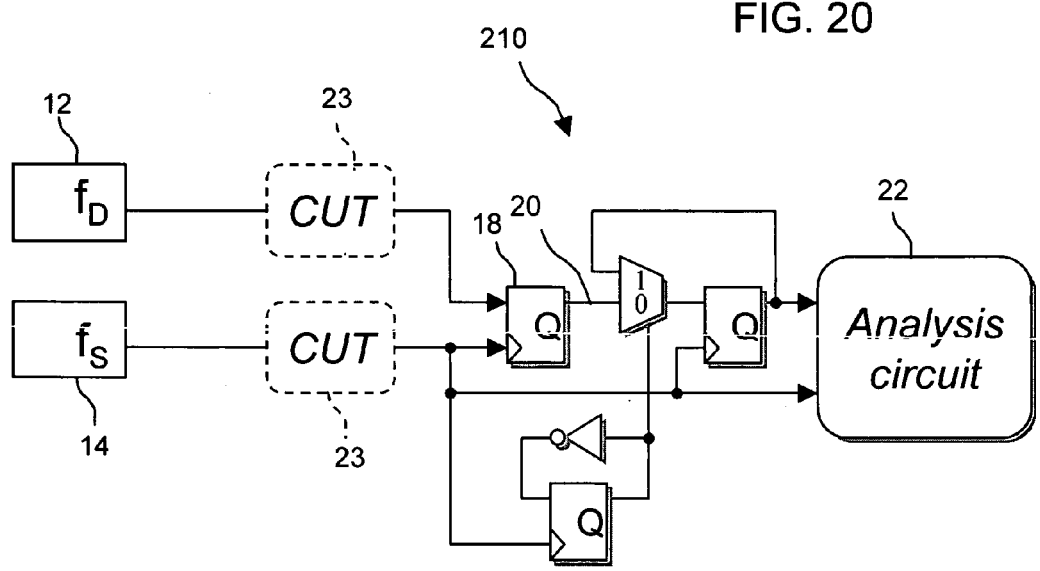
FIG. 20 illustrates an example circuit that further undersamples that latched data by a factor of two.

FIG. 20 shows an example circuit 190 that further undersamples latched data by a factor of two. This permits the analysis circuit to operate at a lower speed, and permits more choice in the values for $f_D$ or $f_S$.

Figure 21A:
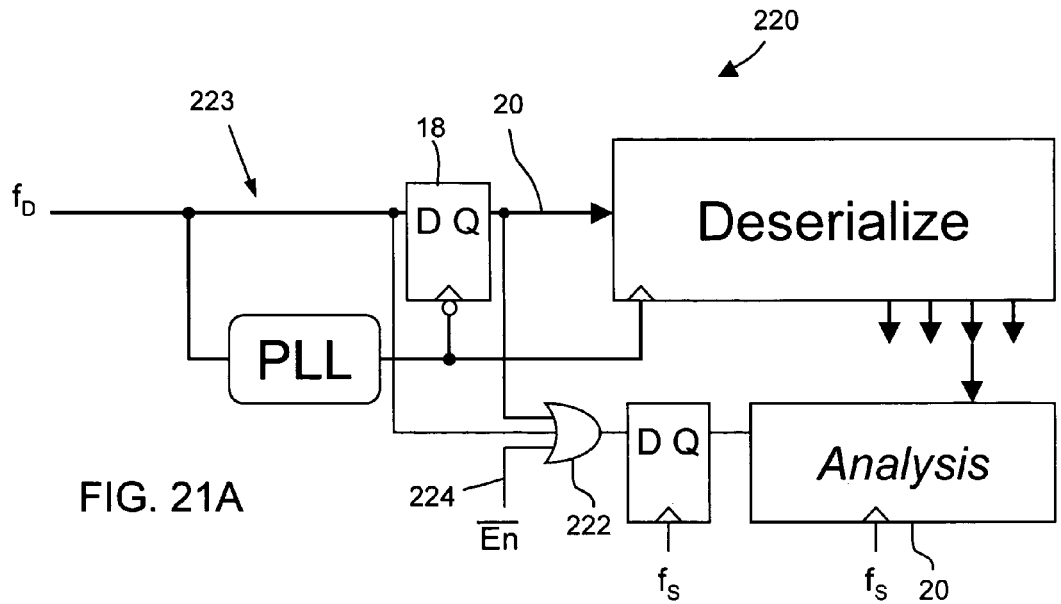
FIG. 21A is a schematic of a circuit to show how a combinational logic gate is connected to an unlatched received data signal and to the output of a latching circuit to measure when the data is being latched in the signal eye, while the PLL is phase locked to $f_D$, according to an embodiment of the invention.
Figure 21B:
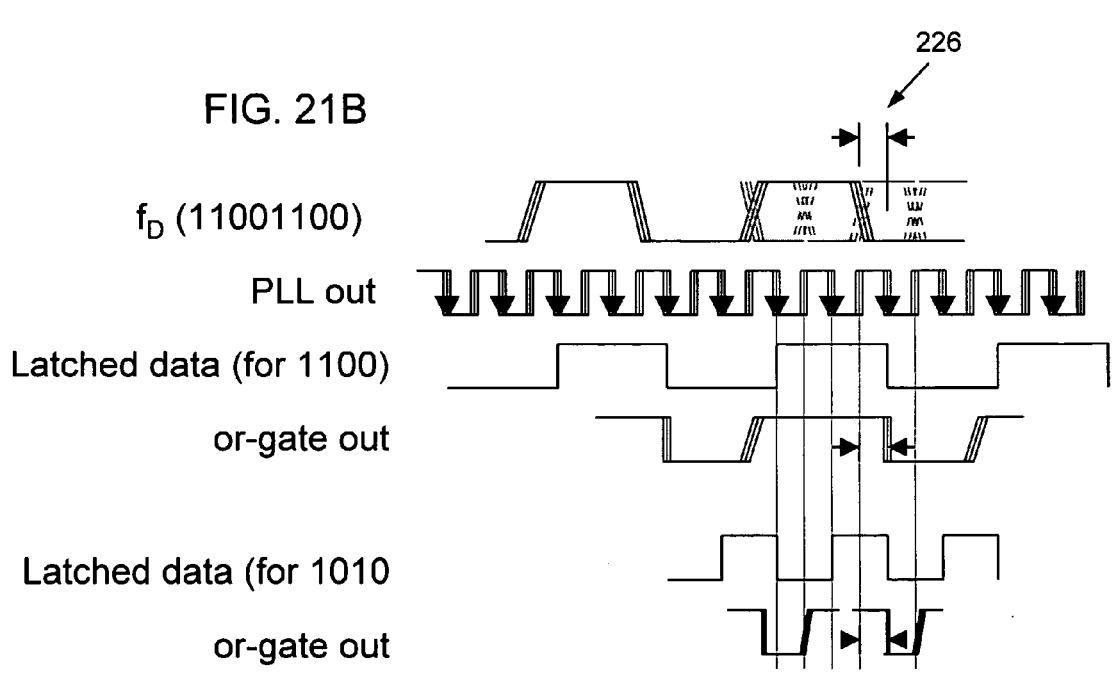
FIG. 21B illustrates waveforms corresponding to the circuit of FIG. 21A.

By connecting the high speed serial output of a SERDES transmitter to the high speed serial input of a receiver, and measuring the receiver jitter, the jitter of both the transmitter and receiver are measured. However, this does not verify that the receiver is sampling the data midway between transitions (i.e., in the middle of the signal eye). To verify this in the prior art, a receiver jitter tolerance test is performed wherein a specific amount of jitter is added to the input signal and the resulting BER measured. In the circuit and method of the present invention, while the receiver is in its normal functional mode and phase-locked to received serial data, the time interval between the unlatched received data edges and the latched received data edges is measured directly. Ideally, this time interval will be equal to 50% of the UI. Circuit 200 in the schematic of FIG. 21A, and corresponding waveforms in FIG. 21B, show how a logic gate, for example an OR-gate 202, is connected to the unlatched received data signal 204 and the output of the latching circuit 18. The transmitted data can be an alternating 1010 pattern or preferably a slower speed alternating pattern such as 11001100 (both-are shown in FIG. 21B). Slower speed patterns permit the logic gate 202 to be a lower speed and lower power circuit, and does not affect the result. An Enable input 206 to the OR-gate 202 permits disabling the gate to further reduce power consumption when not performing this test. The duty cycle of the OR-gate's output is measured using an offset sampling frequency ($f_S$ in FIG. 21A) and counting the number of logic 1's in Q signal 208 for a long time interval, for example 100/R cycles of $f_S$. The difference between the measured duty cycle and 50%, multiplied by twice the number of consecutive ones in the applied pattern (twice one, two, or four, for the examples earlier in this paragraph), is equal to the time interval 210 between the leading edge of the received data and the sampling instant, in units of UI. For example, in FIG. 21B, the signal eye is sampled in its middle; the OR-gate output duty cycle is three eighths or 62.5%. And 62.5% minus 50% equals 12.5%. The number of consecutive ones is equal to two, and twice this is four. Four times 12.5% equals 50%. The signal eye is sampled 50% of a UI after each leading edge of the data bits. The delay through the sampling latch adds a small error that can be characterized or estimated from simulation and it is typically less than 5% of the UI. The jitter tolerance is proportional to the lesser of the measured time interval or 100% minus this time interval, and to the RMS jitter.

An alternative measurement for jitter tolerance is to measure the average duration of stable 1's in the or-gate output signal, which is the complement of the duration of unstable bits described earlier, as a portion of the total measurement interval.

Although the present invention has been described in detail with regard to preferred embodiments and drawings of the invention, it will be apparent to those skilled in the art that various adaptions, modifications and alterations may be accomplished without departing from the spirit and scope of the present invention. Accordingly, it is to be understood that the accompanying drawings as set forth hereinabove are not intended to limit the breadth of the present invention, which should be inferred only from the following claims and their appropriately construed legal equivalents.

We claim:
1. A circuit for measuring a statistical value of jitter for a data signal having a data rate ($f_D$), the circuit comprising:
    a clock generator for generating a clock signal having a clock rate ($f_S$), where the ratio of said clock rate to said data rate ($f_D/f_S$) is an approximately constant non-integer ratio;
    digital latching circuitry for latching said data signal using said clock signal to produce a latched data signal; and
    analysis circuitry for computing a statistical value of jitter based on said latched data signal from said latching circuitry and values of said data rate ($f_D$) and said clock rate ($f_S$).
2. A circuit as defined in claim 1, said analysis circuitry includes a mean edge detector.
3. A circuit for measuring a statistical value of jitter for a data signal having a data rate, $f_D$, the circuit comprising:
    a data clock generator for generating a data signal having a data rate, and a periodic pattern of bits, said periodic pattern of bits being a constant data word repeated continuously or a data word in which all but two bits are random data with the two bits being two different logic values;
    a sampling clock generator for generating a sampling signal having a sampling rate wherein a ratio of said data rate and said sampling rate is an approximately non-integer ratio;
    a data voltage comparator for comparing the voltage of said data signal against a reference voltage and producing a compared data signal;
    a latching circuit having a data input for receiving said compared data signal and a clock input for receiving said sampling signal and producing a latched output signal; and
    an analysis circuit for calculating said statistical value of jitter of said data signal based on data output from the latching circuit, said analysis circuit having a median edge detector for detecting a median edge or mean edge of a group of unstable bits in said latched output signal.
4. A circuit as defined in claim 3, further including a circuit under test disposed between the output of said clock generator and an input of said data voltage comparator.
5. A circuit as defined in claim 3, said analysis circuit including:
    a shift register of sufficient length to contain peak-to-peak jitter present on each edge of said latched output signal, said shift register having a serial input for receiving said latched output signal and being divided into first and second sections of equal length, each said section having a serial input and a serial output;
    select logic for selectively connecting to the serial input of said second section, one of: the serial output of said first section, a complement of the serial output of said first section, and a forcebit signal;
    an input/output (I/O) bits counter for counting bits shifted into and out of said shift register;
    a noise bits counter for counting bits shifted from the serial output of said first section into the serial input of said second section of said shift register;
    a dropped bits counter for counting a number of bits to be excluded from the outputs of said shift register;
    a ratio counter responsive to a ratio input signal for selectively enabling said dropped bits counter and disabling said noise bits counter or disabling said dropped bits counter and enabling said noise bits counter;
    means for setting an expected transition;

one or more measurement counters for counting a number of cycles of the sampling signal during which groups of sampled values are unstable, the count of one of said one or more measurement counters at the end of a measurement period being representative of the jitter in said latched output signal; and a state machine for receiving the serial input and serial output to each said section, applying said forcebit signal and controlling said measurement counters and said means for setting an expected transition.

6. A circuit as defined in claim 5, further including a period counter for counting a predetermined measurement period as a number of sampling clock cycles in response to a period input signal.

7. A circuit as defined in claim 5, one of said measurement counters being responsive to a sampling mode signal indicating whether jitter is to be measured on both rising and falling edges of said latched output signal; only on the rising edge of said latched output signal, or only on the falling edge of said latched output signal.

8. A circuit as defined in claim 5, said state machine being responsive to a sampling mode input signal to determine whether average or peak-to-peak measurement is determined.

9. A method for measuring a statistical value of jitter for a data signal having a data rate $f_D$, comprising:
digitally sampling said data signal at a sampling rate, $f_S$, to produce sampled logic values, where $f_D/f_S$ is a predetermined non-integer ratio; and
analyzing said sampled logic values to deduce a statistical value of the jitter.

10. A method as defined in claim 9, said analyzing said sampled logic values includes detecting each transition region within which jitter occurs following each sequence of a predetermined number of consecutive same logic values within a predetermined measurement period.

11. A method as defined in claim 9, said analyzing said sampled logic values includes calculating a statistical value which is one of a histogram, a probability density function, a cumulative distribution function, a variance, a median, a mean a standard deviation, or a root mean square.

12. A method as defined in claim 9, further including calculating a peak-to-peak value based on said statistical value.

13. A method as defined in claim 9, further including identifying a median edge within groups of unstable bits in said data signal by using a counter having a maximum count of at least J, where:

$2J$ equals $J_{PP}/(R/f_D)$;

$J_{PP}$ is expected maximum peak-to-peak jitter during a measurement time interval; and
R is the difference between $f_D/f_S$ and the nearest integer to $f_D/f_S$.

14. A method as defined in claim 9, said analyzing said sampled logic values includes detecting at least one predetermined percentile of an edge time cumulative distribution function.

15. A method as defined in claim 9, said analyzing said sampled logic values includes generating a histogram (PDF) or a cumulative histogram (CDF) of the data signal's jitter.

16. A method as defined in claim 15, said analyzing said sampled logic values includes computing the standard deviation of jitter in said data signal based on the output PDF or CDF.

17. A method as defined in claim 9, said analyzing said sampled logic values includes counting the number of latch output transitions within a predetermined number of percentiles of a median edge, the reciprocal of the count being a measure of the amount of deterministic jitter.

18. A method as defined in claim 9, further including generating said data signal to include pseudo-random data with predetermined pairs of consecutive data bits periodically set to a constant value.

19. A method as defined in claim 9, further including latching said data signal or a clock recovered from said data signal or a combination of the data signal and the recovered clock, and said analyzing sampled logic values includes computing jitter tolerance of circuitry that generates the recovered clock and latches data.

20. A method as defined in claim 9, said analyzing said sampled logic values includes storing said sampled logic values in a memory and analyzing the sampled logic values at a later time.

21. A method as defined in claim 9, further including adding a DC voltage offset to the data signal prior to said digital sampling.

22. A method as defined in claim 9, said data signal having a waveform with a periodic pattern incorporated therein, said periodic pattern being a continuously serially transmitted constant digital word, or a continuously serially transmitted digital word having bits that have a random value and bits that have a constant value.

23. A method as defined in claim 22, wherein, for a two-level data signal, two adjacent bits in every word of said data signal have constant logic values of 01 or 10.

24. A method as defined in claim 9, said analyzing said sampled logic values includes calculating peak-to-peak high-frequency jitter by measuring total time during which a value is unstable relative to a total measurement time interval, over a time interval having at least 2/R cycles of said sampling rate where unstable means that the latched data bit stream is not a constant logic value for a predetermined number of consecutive sampled values and R is the difference between $f_D/f_S$ and the nearest integer to $f_D/f_S$.

25. A method as defined in claim 24, said analyzing sampled values includes calculating RMS high-frequency jitter similarly to calculating peak-to-peak high-frequency jitter except that unstable is a time interval having a predetermined percentage of unstable bits on either side of a median bit for each group of unstable bits.

26. A method as defined in claim 9, further including determining jitter modulation or low frequency jitter by:
capturing unstable bits in a capture shift register;
shifting out the content of said capture shift register at low speed together with a count of the number of sampling clock cycles since a median of a last captured group of unstable bits, said count forms a timestamp; and
graphing timestamps relative to a constant average interval between said median edges to reveal said jitter modulation or low frequency jitter.

27. A method as defined in claim 26, wherein, to measure wideband jitter, each said group of unstable bits is shifted left or right by a number of bits indicated by a value indicative of median phase wander relative to a constant base frequency;
accumulating the groups of unstable bits to generate a period centered histogram where the number of logic ones in each bit position is summed to produce a bin value and computing an RMS value from said histogram.

28. A method as defined claim 26, wherein, further including, measuring jitter in said multi-level data signal by measuring the jitter in data bits derived from the multi-level signal by a function under test, each level of said multi-level data signal representing a symbol associated with one of said data bits, outputting bits in parallel, detecting jitter by monitoring appropriate parallel latched bits for each level transition of interest.

29. A method for measuring jitter in a reference signal A, comprising:
    a) generating two other signals, B and C whose frequencies all differ from each other by constant non-integer ratios;
    b) measuring the jitter of signal A relative to signal B according to the method of claim 21, to obtain a measurement of the sum of the jitter of signal A and the jitter of signal B, where signals A and B have uncorrelated jitter;
    c) measuring the jitter of signal B relative to signal C according to the method of claim 21, to obtain a measurement of the sum of the jitter of signal B and the jitter of signal C, where signals B and C have uncorrelated jitter;
    d) measuring the jitter of signal A relative to signal C according to the method of claim 21, to obtain a measurement of the sum of the jitter of signal A and the jitter of signal C, where signals C and A have uncorrelated jitter; and
    e) solving three simultaneous linear equations relating said measurement obtained in steps b), c) and d to obtain an estimate of the jitter of each of signals A, B and C.

30. A method as defined in claim 29, further including extending the method to any number of pairs of signals, in which each pair being measured has a non-integer ratio of frequencies, and the step for solving simultaneous linear equations involves three or more equations.

31. A method for measuring jitter in a reference signal, Ain, comprising:
    a) connecting Ain to a first phase locked loop, PLLea, having an output Aout, and generating a frequency Bin having a frequency that differs from that of Ain by a non-integer ratio and which is connected to a second phase locked loop, PLLb, having an output Bout;
    b) measuring the jitter of signal Aout relative to signal Bout according to the method of claim 21 to obtain a measurement of the sum of the jitter of signal Ain and the jitter of signal Bout;
    c) measuring the jitter of signal Aout relative to signal Bin according to the method of claim 21 to obtain a measurement of the sum of the jitter of signal Aout and the jitter of signal Bout;
    d) measuring the jitter of signal Bout relative to signal Ain according to the method of claim 21 to obtain a measurement of the sum of the jitter of signal Ain and the jitter of signal Bout;
    e) measuring the jitter of signal Ain relative to signal Bin according to the method of claim 21 to obtain a measurement of the sum of the jitter of signal Ain and the jitter of signal Bout; and
    f) solving four simultaneous linear equations relating said measurements obtained in steps b), c), d) and e) to obtain an estimate of the jitter of each of signals Ain, Aout, Bin and Bout.

32. A method for statistically measuring timing parameters of a data signal, said parameters including jitter, duty cycle, and transition time, said method comprising:
    generating said data signal at a data frequency and containing a periodic pattern consisting of one or more constant data bits and any number of random data bits, each data bit or multi-bit data symbol of said pattern having a duration of one unit interval equal to the period of said data signal;
    comparing said data signal to a DC voltage to produce a comparison result;
    sampling said comparison result at a sampling frequency the ratio of said data frequency to said sampling frequency being a predetermined approximate non-integer ratio; and
    calculating statistical values of one of said timing parameters as a fraction of said one unit interval based on a number of ones in intervals of a predetermined length, and, when a timing parameter is voltage-related, the DC voltage, voltages; said statistical values include standard deviation, average, median, mean and peak-to-peak value.

33. A method for measuring a statistical value of jitter for a data signal having a data rate, comprising:
    generating said data signal at said data rate and including therein a periodic pattern of bits;
    generating a sampling rate signal having a sampling rate, ratio of said data rate to said sampling rate a non-integer equal to K±R, where K is an under-sampling ratio which is an integer and R is measurement resolution relative to a unit interval (UI) equal to the period of said data rate;
    sampling said data signal using said sampling signal to produce sampled values; and
    analyzing said sampled values within a predetermined measurement period so as to detect each transition region within which jitter occurs and which follows a predetermined number of consecutive logic values; and
    counting predetermined bits proximate each said transition region to deduce a statistical value of said jitter.

34. A method as defined in claim 33, said periodic pattern of bits being either a constant data word repeated continuously or a data word in which all but two bits are random data with the two bits being two different logic values.

35. A circuit for measuring a statistical value of jitter for a data signal having a data rate ($f_D$), the circuit comprising:
    an input for receiving said data signal;
    an input for receiving a clock signal having a clock rate ($f_S$), where the ratio of said clock rate to said data rate ($f_D/f_S$) is an approximately constant non-integer ratio;
    digital latching circuitry for latching said data signal using said clock signal to produce a latched data signal; and
    analysis circuitry for computing a statistical value of jitter based on said latched data signal by detecting a median or mean edge within groups of unstable bits in said latched data signal.

36. A circuit as defined in claim 35, said analysis circuitry includes one or more counters for counting logic 1 or logic 0 bits in time intervals around said median or mean edge.

37. A circuit as defined in claim 36, said analysis circuitry further including means for selectively computing high frequency jitter or low frequency jitter.

38. A circuit as defined in claim 36, wherein the statistical value is one of a histogram, probability density function, cumulative distribution function, variance, standard deviation, media, mean or root mean square.

39. A circuit as defined in claim 36, said analysis circuitry further computes a peak-to-peak value based on said statistical value.

40. A circuit as defined in claim 36, wherein one or more elements of said circuit are elements of a circuit under test.

41. A circuit as defined in claim 36, said analysis circuitry includes a memory and a computer.

42. A circuit as defined in claim 36, said median edge detector includes a counter having a maximum count of at least J, where:

$$2J \text{ equals } J_{PP}/(R/f_D);$$

$J_{PP}$ is expected maximum peak-to-peak jitter during a measurement time interval; and R is the difference between $f_D/f_S$ and the nearest integer to $f_D/f_S$.

43. A circuit as defined in claim 36, said analysis circuitry includes means for detecting at least one predetermined percentile of an edge time cumulative distribution function.

44. A circuit as defined in claim 36, said analysis circuitry includes means for generating a histogram (PDF) or a cumulative histogram (CDF) of the data signal's jitter, said means for generating, including:

a shift register for shifting data bits from the output of said digital latching circuitry, each data bit representing a bin position in a CDF or PDF when each said median edge is detected; and digital counters for counting logic 1's or logic 0's in a bin position when each said median edge is detected at a predetermined position within said shift register.

45. A circuit as defined in claim 36, said analysis circuitry includes means for counting a number of latch output transitions within a predetermined number of percentiles of a median edge, wherein a reciprocal of the number of latch output transitions being a measure of the amount of deterministic jitter.

46. A circuit as defined in claim 36, said data signal comprises pseudo-random data with predetermined pairs of consecutive data bits periodically set to a constant value.

47. A circuit as defined in claim 36, said latching circuitry latches said data signal or a clock recovered from said data signal or a combination of the data signal and the recovered clock, and the analysis circuitry includes means to compute jitter tolerance of circuitry that generates the recovered clock and latched data signal.

* * * * *